United States Patent
Lee et al.

(10) Patent No.: US 10,788,968 B2
(45) Date of Patent: Sep. 29, 2020

(54) TERMINAL DEVICE AND METHOD OF CONTROLLING SAME

(71) Applicant: SAMSUNG ELECTRONICS CO., LTD., Suwon-si, Gyeonggi-do (KR)

(72) Inventors: Jung-kun Lee, Seoul (KR); Jang-woo Lee, Seoul (KR); Hye-won Lee, Seoul (KR); Jung-won Lee, Seoul (KR)

(73) Assignee: SAMSUNG ELECTRONICS CO., LTD., Suwon-si, Gyeonggi-do (KR)

( * ) Notice: Subject to any disclaimer, the term of this patent is extended or adjusted under 35 U.S.C. 154(b) by 241 days.

(21) Appl. No.: 14/926,209

(22) Filed: Oct. 29, 2015

(65) Prior Publication Data

US 2016/0124626 A1   May 5, 2016

(30) Foreign Application Priority Data

Oct. 29, 2014 (KR) ................. 10-2014-0148262

(51) Int. Cl.
| | | |
|---|---|---|
| G06F 3/00 | (2006.01) | |
| G06F 3/0484 | (2013.01) | |
| H04W 4/80 | (2018.01) | |
| G06F 9/451 | (2018.01) | |
| H04M 1/725 | (2006.01) | |

(Continued)

(52) U.S. Cl.
CPC ........ *G06F 3/04847* (2013.01); *G06F 3/0484* (2013.01); *G06F 3/1454* (2013.01); *G06F 9/451* (2018.02); *G06F 21/445* (2013.01); *G06F 21/6245* (2013.01); *H04M 1/7253* (2013.01); *H04M 1/72522* (2013.01); *H04M 1/72525* (2013.01); *H04W 4/80* (2018.02);

*G06F 2221/2129* (2013.01); *G09G 5/12* (2013.01); *G09G 2370/06* (2013.01); *H04M 2250/04* (2013.01)

(58) Field of Classification Search
CPC ... G06F 3/04847; G06F 3/0484; G06F 3/1454
See application file for complete search history.

(56) References Cited

U.S. PATENT DOCUMENTS

| | | |
|---|---|---|
| 8,661,350 B2 | 2/2014 | Kim et al. |
| 2005/0182767 A1* | 8/2005 | Shoemaker ............. G06F 16/22 |

(Continued)

FOREIGN PATENT DOCUMENTS

| | | |
|---|---|---|
| CN | 101924823 | 12/2010 |
| CN | 102272747 | 12/2011 |
| KR | 10-2010-0109352 | 10/2010 |

OTHER PUBLICATIONS

Search Report dated Feb. 18, 2016 in counterpart International Patent Application No. PCT/KR2015/011507.

(Continued)

*Primary Examiner* — Nicholas Augustine
(74) *Attorney, Agent, or Firm* — Nixon & Vanderhye, P.C.

(57) ABSTRACT

A terminal device is disclosed. The terminal device includes, for example: a communication interface configured to receive UI information set in another terminal device; input circuitry configured to receive selection of UI setting to be applied to the terminal device from among UIs set in another terminal device based on the received UI information; a controller configured to set a UI of the terminal device based on the selected UI setting; and a display configured to display the set UI.

15 Claims, 33 Drawing Sheets

(51) Int. Cl.
*G06F 3/14* (2006.01)
*G06F 21/44* (2013.01)
*G06F 21/62* (2013.01)
*G06F 3/01* (2006.01)
*G09G 5/12* (2006.01)

(56) References Cited

U.S. PATENT DOCUMENTS

| | | | |
|---|---|---|---|
| 2010/0115053 | A1 | 5/2010 | Ryu et al. |
| 2011/0029891 | A1 | 2/2011 | Kim et al. |
| 2011/0154255 | A1 | 6/2011 | Ryu et al. |
| 2012/0088548 | A1 | 4/2012 | Yun et al. |
| 2012/0303834 | A1* | 11/2012 | Adam ............... H04N 21/6377 709/231 |
| 2013/0065521 | A1* | 3/2013 | Jang ................. G06K 7/10237 455/41.1 |
| 2013/0159872 | A1 | 6/2013 | Son et al. |
| 2013/0185647 | A1* | 7/2013 | Yu ..................... G06F 3/04847 715/740 |
| 2014/0095710 | A1 | 4/2014 | Kazan et al. |
| 2014/0203999 | A1 | 7/2014 | Shim |
| 2014/0237378 | A1* | 8/2014 | Gonen ............... G06F 3/04817 715/745 |
| 2014/0304313 | A1 | 10/2014 | Choi |
| 2015/0113432 | A1* | 4/2015 | Jung .................. G06F 3/04883 715/748 |
| 2015/0350141 | A1* | 12/2015 | Yang .................. H04L 51/046 709/206 |
| 2018/0032997 | A1* | 2/2018 | Gordon ............. G06Q 20/3224 |

OTHER PUBLICATIONS

Written Opinion dated Feb. 18, 2016 in counterpart International Patent Application No. PCT/KR2015/011507.
Extended Search Report dated Sep. 11, 2017 in counterpart European Patent Application No. 15853906.4.
Rerware LLC, "MyBackup (Pro)—4.0.2 High Level Understanding of the Applications(s)," Nov. 21, 2013, pp. 2-12, retrieved from the Internet: url:http://www.rerware.com/Android-Backup/MyBackupUserGuide.pdf (retrieved Sep. 1, 2017), XP 055403047.
Gunter, Cory, "Android 5.0 Tap & Go Restores Your Phone in Minutes," Oct. 19, 2014, retrieved from the Internet: url:https://www.gottabemobile.com/android-5-0-tap-go-restores-your-phone-in-minutes/ (retrieved Sep. 1, 2017), XP 055403381.
Communication pursuant to Article 94(3) EPC dated Jun. 21, 2018 in counterpart European Patent Application No. 15853906.4.
First Office Action dated Nov. 27, 2019 in counterpart Chinese Patent Application No. 201580058599.7 and English-language machine translation.
Examination Report dated Jun. 21, 2020 in counterpart Indian Patent Application No. 201717017513.

* cited by examiner

FIG. 29

| 2910 | 2920 | 2930 | 2940 | 2950 |
|---|---|---|---|---|
| The albums you loved for the last week | Pink True Love | The photos you took for the last week 847 | Your New Best Friends | Recently Registered Contacts 283 |

# TERMINAL DEVICE AND METHOD OF CONTROLLING SAME

CROSS-REFERENCE TO RELATED APPLICATIONS

This application is based on and claims priority under 35 U.S.C. § 119 to Korean Patent Application No. 10-2014-0148262, filed on Oct. 29, 2014, in the Korean Intellectual Property Office, the disclosure of which is incorporated by reference herein in its entirety.

BACKGROUND

Field

Apparatuses and methods consistent with the disclosure relate to a terminal device and a method of controlling the terminal device, for example, to a terminal device which can easily apply settings and data of an existing terminal device to a new terminal device, and a method of controlling the same.

Description of Related Art

Terminal devices can connect to the Internet through a telecommunication network and provide various contents to users using the Internet. Recent terminal devices such as smartphones can install various applications and set various user interfaces (UIs), so that users can change and use various settings of the terminal devices according to the functions that the users need and users' tastes.

However, when such a terminal device is replaced with another terminal device, the user must set the settings in the new terminal device again according to the functions that the user needs and user's taste, which may cause inconvenience.

Recent terminal devices provide a UI screen to receive selection of various settings from the user in an initial setting stage (specifically, when the user purchases a terminal device and initially boots it). However, such initial settings are merely first settings to use the new terminal device, such as connecting to the Internet, setting an authentication pattern, etc., and are not settings that reflect the functions that the user needs and user's tastes.

Therefore, there are problems when the user must set or install the functions that are installed in an existing terminal device in a new terminal device, and must manually move the contents stored in the existing terminal device one by one

SUMMARY

Examples of the disclosure overcome the above disadvantages and other disadvantages not described above.

The disclosure provides a terminal device which can easily apply settings and data of an existing terminal device to a new terminal device, and a method for controlling the same.

According to an example of the disclosure, a terminal device includes: a communication interface configured to receive UI information set in another terminal device; input circuitry configured to receive selection of at least one UI setting to be applied to the terminal device from among UIs set in another terminal device based on the received UI information; a controller configured to set a UI of the terminal device based on the selected UI setting of the another terminal device; and a display configured to display the set UI.

The display may be configured to display a plurality of UI items set in another terminal device in sequence, and the input circuitry may be configured to receive a selection of whether or not to apply each of the displayed UI items to the terminal.

The communication interface may be configured to further receive at least one of device setting information set in another terminal device, contents stored in another terminal device, and data on applications installed in another terminal device. The terminal device may further include a storage or memory configured to store at least one of the received device setting information, contents, and data on the applications.

The controller may be configured to install, on the terminal device, an application corresponding to an application installed on another terminal device based on the received application data.

The display may be configured to display a list of contents stored in another terminal device, and the communication interface may be configured to receive only a selected content from the displayed list.

The display may be configured to group the contents stored in another terminal device based on predetermined information, and to display a list of groups.

The display may be configured to arrange the contents stored in another terminal device based on frequency of use, and to display the contents.

The controller may be configured to reproduce at least one of the contents transmitted from another terminal device prior to displaying the set UI.

The controller may be configured to determine a using history based on the contents and the application data stored in another terminal device prior to displaying the set UI, and to control the display to display a welcome message corresponding to the determined using history.

In response to the terminal device receiving an initial language setting from the user, the controller may be configured to control the communication interface to receive the UI information.

The controller may be configured to control the display to display function introduction information reflecting a content stored in another terminal device.

The UI information may include at least one of information on a background screen of a lock screen, information on a locking method of the lock screen, information on a background screen of a home screen, information on application arrangements on the home screen, and information on widget arrangements on the home screen.

According to another example of the disclosure, a terminal device includes: a communication interface configured to receive, from another terminal device, information on at least one UI setting to be applied to the terminal device from among UIs set in another terminal device; a controller configured to set a UI of the terminal device based on the information of the UI setting; and a display configured to display the set UI.

According to another example of the disclosure, a terminal device includes: a communication interface configured to receive UI information set in another terminal device in response to the terminal device being initially booted and then entering an initial setting state; a controller configured to set a UI of the terminal device based on the received UI setting; and a display configured to display the set UI.

According to another example of the disclosure, a terminal device which is connectable with another terminal device includes: a display configured to display a plurality of UI items set in the terminal device in sequence; input circuitry configured to receive a selection of whether to apply each of the displayed UI items to another terminal device; and a communication interface configured to transmit, to another terminal device, information for setting the selected UI item to be set in another terminal device.

According to another example of the disclosure, a computer-readable recording medium includes a program for executing a method for controlling of a terminal device, the method including: receiving UI information set in another terminal device; receiving a selection of a UI setting to be applied to the terminal device from among UIs set in another terminal device based on the received UI information; setting a UI of the terminal device based on the selected UI setting; and displaying the set UI.

Additional and/or other aspects and advantages of the disclosure may be set forth in part in the description which follows and, in part, will be apparent from the description.

BRIEF DESCRIPTION OF THE DRAWINGS

The above and/or other aspects of the disclosure will become more apparent from the following detailed description, taken in conjunction with the accompanying drawings, in which like reference numerals refer to like elements, and wherein:

FIGS. 4 to 30 are views illustrating various examples of a user interface window which is displayed on a display of the example illustrated in FIG. 3;

DETAILED DESCRIPTION

Figure 1:
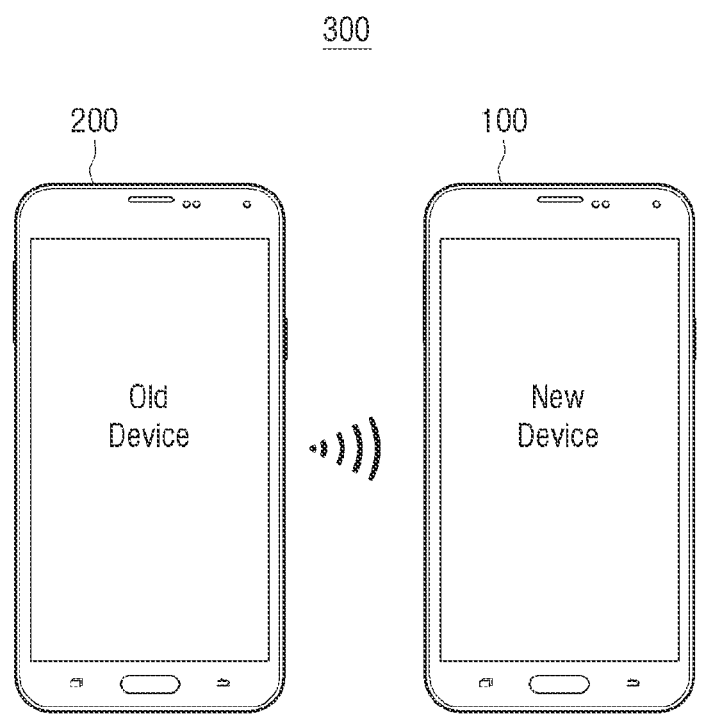
FIG. 1 is a block diagram illustrating an example configuration of a network system.

The examples of the disclosure may be diversely modified. Accordingly, example embodiments are illustrated in the drawings and are described the detailed description. However, it is to be understood that the disclosure is not limited to a specific example embodiment, but includes all modifications, equivalents, and substitutions without departing from the scope and spirit of the disclosure. Also, well-known functions or constructions are not described in detail since they may obscure the disclosure with unnecessary detail.

The terms "first", "second", etc. may be used to describe diverse components, but the components are not limited by the terms. The terms are only used to distinguish one component from the others.

The terms used in the disclosure are merely used to describe the example embodiments, but are not intended to limit the scope of the disclosure. The singular expression also includes the plural meaning as long as it does not conflict with the context. In the disclosure, the terms "include" and "comprising" designate the presence of features, numbers, steps, operations, components, elements, or a combination thereof that are written in the disclosure, but do not exclude the presence or possibility of addition of one or more other features, numbers, steps, operations, components, elements, or a combination thereof.

In the examples of the disclosure, a "module" or a "unit" performs at least one function or operation, and may be implemented with hardware (e.g., processing circuitry, circuits, etc.), software, or a combination of hardware and software. In addition, a plurality of "modules" or a plurality of "units" may be integrated into at least one module except for a "module" or a "unit" which has to be implemented with specific hardware, and may be implemented with at least one processor (not shown).

Hereinafter, the disclosure will be described in detail with reference to the accompanying drawings.

FIG. 1 is a block diagram illustrating a configuration of a network system.

Referring to FIG. 1, the network system 300 may include a first terminal device 100 and a second terminal device 200.

The second terminal device 200 (sometimes referred to herein as an old terminal device) is a terminal device to which a pre-set UI is applied. In addition, the second terminal device 200 may have various applications pre-installed thereon or have various data pre-stored therein.

The second terminal device 200 may provide set UI information to another terminal device 100. For example, the second terminal device 200 may provide information on the UI set in the second terminal device 200 (or UI information) to the first terminal device 100. For example, the second terminal device 200 may provide device setting information, contents, information on applications, etc. to the first terminal device 100 along with the UI information.

The UI information recited herein may, for example, include information on a background screen of a lock screen set in the second terminal device 200, information on a locking method of the lock screen, information on a widget of the lock screen, information on a background screen of a home screen, information on application arrangements on the home screen, information on widget arrangements on the home screen, etc.

In addition, the application information may, for example, include a name of an application installed on the second terminal device 200, an installation file of the application, information on an URL address for receiving the installation file of the application, information on data used in the installed application (for example, information on phone numbers of a telephone application, information on user health of a health application), etc.

In addition, the device setting information may, for example, include account information, wireless communication connection information, etc., and the contents may, for example, include a moving image file, a picture file (or a photo file), a sound source file (ex., MP3), a document file, etc.

The first terminal device 100 (sometimes referred to herein as a new terminal device) may receive the UI information from the second terminal device 200, and may set the UI of the first terminal device 100 based on the received UI information. For example, the first terminal device 100 may receive selection of UI settings to be applied to the first terminal device 100 from among the UI settings installed in the second terminal device 200 based on the UI information received from the second terminal device 200. In addition, the first terminal device 100 may set the UI of the first terminal device 100 according to the selected UI settings.

In addition, the first terminal device 100 may receive various contents stored in the second terminal device 200 and store the contents, and may receive information on applications installed on the second terminal device 200 and/or setting options, etc., and may apply the applications and/or the setting options of the second terminal device 200 to the first terminal device 100.

Since the network system 300 according to the example described above can apply the UI set in the second terminal device 200 to the new terminal device, the first terminal device 100, the user can easily use the new terminal device in the same state as the environment that the user has previously used, for example with the second device 200. In addition, since such an installing operation can be performed by a simple selecting operation on various items, synchronization can be performed by better reflecting user's intention.

In the explanation of FIG. 1, the first terminal device 100 and the second terminal device 200 are illustrated as having different configurations. However, there is only a difference in whether the device provides information or receives information, and the first terminal device 100 may operate as the second terminal device 200 and the second terminal device 200 may operate as the first terminal device 100. For example, when the UI of the second terminal device 200 is installed in the first terminal device 100 in the above-described method, the first terminal device 100 may provide its own UI settings to another new terminal device afterward.

In addition, in the explanation of FIG. 1, the first terminal device 100 is connected with the one second terminal device 200. However, the first terminal device 100 may be connected with a plurality of second terminal devices 200. For example, the UI settings and/or various data of the plurality of terminal devices may be applied to a single device. In addition, the second terminal device 200 may be connected with a plurality of first terminal devices 100. For example, the settings and/or various data of a single terminal device may be commonly set in a plurality of terminal devices.

In addition, in the above explanation, the above-described operation is performed when the first terminal device 100 is initially turned on by the user (that is, an initial setting stage such as language setting or an initial booting state when a terminal device is initialized at a factory). However, the above-described operation may be performed at other times.

In addition, in the above explanation, the first terminal device is the same type of device as the second terminal device. However, the first terminal device 100 and the second terminal device 200 may be different types of devices. For example, the second terminal device 200 may be a digital TV in which applications can be installed, and the first terminal device 100 may be a smartphone. An example of this will be explained below with reference, for example, to FIG. 30. In addition, the same types of devices may have different operating systems, and the same operating systems may have different versions.

In addition, according to an example, the devices may be directly connected with each other or may be indirectly connected with each other via a router or another device (for example, a sharing device, a cloud server, etc.). In addition, in the illustrated example, the devices may be connected with each other in a wireless manner or a wired manner.

In addition, in the explanation of FIG. 1, the first terminal device 100 receives the selection of the settings to be applied to the first terminal device from among the UI settings of the second terminal device 200. However, according to an example, this selection may be performed in the second terminal device 200. This will be explained below with reference, for example, to FIG. 14.

Figure 2:
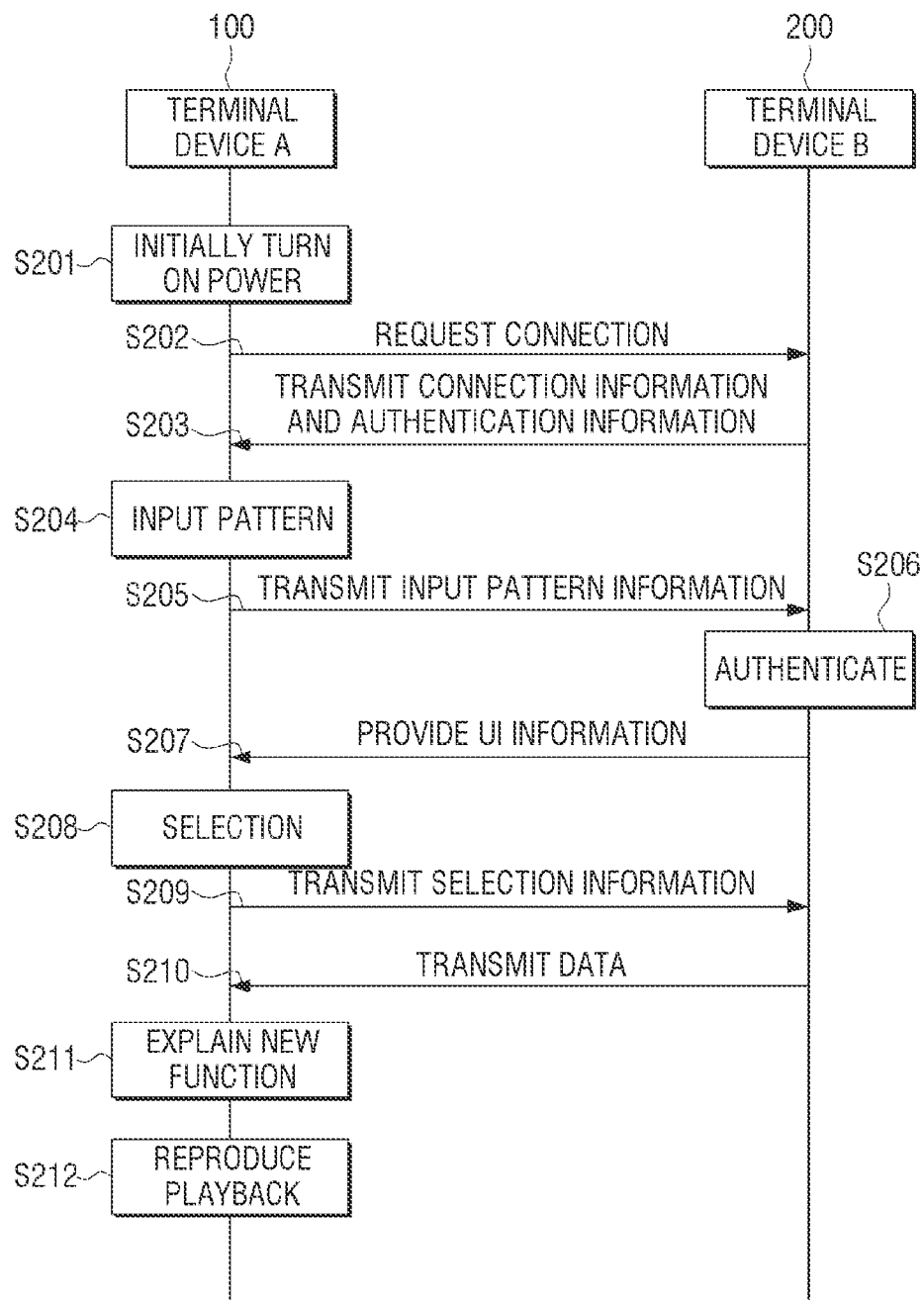
FIG. 2 is a sequence diagram illustrating an example method for transmitting settings and data of a first terminal device to a second terminal device.

FIG. 2 is a sequence diagram illustrating an example method for transmitting settings and data from an old terminal device 200 to a new terminal device 100.

First, the first terminal device 100 (e.g., terminal device A) may be initially turned on by the user (S201). In this case, the first terminal device 100 may receive selection of a language to be displayed.

In response to the language to be displayed being selected, the first terminal device 100 may set the selected language as a basic language, and receive selection of whether to perform UI synchronization. In the following explanation, an operation of setting the UI set in another terminal device 200 in the new terminal device 100 will be referred to as UI synchronization for ease of explanation.

UI synchronization may, for example, include not only an operation of synchronizing UI settings, but also an operation of synchronizing contents stored in a terminal device and various settings. The terminal device according to an example embodiment may synchronize not only UI settings but also contents, applications, device settings, etc., and thus user convenience can be enhanced.

In response to the performance of the UI synchronization being selected by the user, the first terminal device 100 may request connection to the second terminal device 200 (e.g., terminal device B) in order to acquire authority to access information on the second terminal device 200 (S202). The request may be made by an NFC tag operation. For example, in response to an NFC tag operation, the second terminal device 200 may activate an application or a specific function of an operating system to perform the operation according to an example embodiment. When the application and the operating system according to an example embodiment are not installed in the second terminal device 200, an installation file on the application according to an example embodiment or a URL address for downloading the installation file may be transmitted by the NFC tag operation.

The second terminal device 200 which receives such a request (for example, an NFC tag) may, for example, transmit, to the first terminal device 100, wireless connection information for P2P wireless connection with the first terminal device 100 (for example, WiFi direct connection information, or wireless connection setting information), and information on an authentication method of the second terminal device 200 (or authentication method information) (S203).

The first terminal device 100 which receives such information may, for example, establish a P2P wireless connection with the second terminal device 200 based on the wireless connection information received from the first terminal device 100. In addition, the first terminal device 100 may display an authentication UI screen to acquire the authority to access the information stored in the second terminal device 200, and may receive authentication information through the displayed UI screen (S204). For example, the recent terminal devices support various authentication methods, and, since the first terminal device 100 does not know the authentication method of the second terminal device 200, the second terminal device 200 may provide information on its own authentication method to the first terminal device 100 which requests authentication. Accordingly, the first terminal device 100 may display a UI based on the transmitted authentication method. For example, when the authentication method of the second terminal device 200 is a pattern input method, the first terminal device 100 may display a UI screen for receiving a pattern. The authentication UI screen displayed on the first terminal device 100 may, for example, be the same as the authentication UI screen on the second terminal device 200.

In addition, when the authentication method of the second terminal device 200 is a number key input method, the first terminal device 100 may display a UI screen for receiving a number key. When the authentication method is a method using biometric data (for example, a fingerprint), the first terminal device 100 may display a message to receive input of biometric data for the user. However, when there is no configuration to receive input of biometric data in the first terminal device 100, the above-described authentication may be directly performed in the second terminal device 200. In this case, the first terminal device 100 may display a message informing that the authentication should be directly performed by the second terminal device 200.

In response to the authentication information being input to the first terminal device 100, the first terminal device 100 may transmit the authentication information to the second terminal device 200 and request authentication (S205). The second terminal device 200 which receives the authentication information may authenticate whether the user has authority to use the information of the second terminal device 200 based on the received authentication information (S206).

In response to the user being authenticated to have the authority, the second terminal device 200 may provide information on the UI pre-set in the second terminal device 200 to the first terminal device 100 (S207). In this case, the second terminal device 200 may also transmit contents pre-stored in the second terminal device 200 and/or information on pre-installed applications.

The first terminal device 100 which receives such UI information may display a plurality of UI items (or synchronization items) set in the second terminal device 200 based on the received UI information, and may receive selection of a UI item to be applied to the first terminal device 100 (S208). The synchronization item recited herein is an item which has a broader meaning than that of the UI item, and the synchronization item may include UI items, a content item, an application item, a device setting item, etc.

In addition, the first terminal device 100, which receives the selection of the UI item to be applied, may request transmission of data corresponding to the selected UI item from the second terminal device 200, and receive the data (S209 and S210).

Accordingly, the first terminal device 100 may set the UI using the data received regarding the selected UI item. During this process, the first terminal device 100 may display information explaining the functions of the first terminal device 100 (S212). Such information may be provided using contents pre-stored in the second terminal device 200. This will be explained below with reference to FIGS. 22 to 25.

In response to all settings being finished, a welcome message for welcoming use of the new terminal device 100 may be reproduced in a playback form (S212). The playback recited herein refers to summarizing user's experiences in a terminal device that the user has used, and displaying the summarized experiences for the user. This will be explained below with reference to FIGS. 26 to 29.

In the explanation of FIG. 2, the information for authenticating with respect to the second terminal device 200 is received in the first terminal device 100. However, according to an example embodiment, the authentication information may be directly input in the second terminal device 200.

In addition, in the explanation of FIG. 2, the UI synchronization is performed when the first terminal device 100 is initially turned on. However, according to an example embodiment, the UI synchronization may be performed at any desired time as well as at the time when the device is initially turned on.

In addition, in the explanation of FIG. 2, the functions of the first terminal device are introduced after the data is received. However, according to an example embodiment, the functions of the first terminal device may be introduced in parallel with the process of receiving the data.

The above-described UI synchronization may be performed by an application or an operating system. Preferably, the UI synchronization may be performed by the operating system to be provided when the terminal device is initially driven. However, the old terminal device may provide the UI synchronization function by installing an application for the sake of compatibility.

Figure 3:
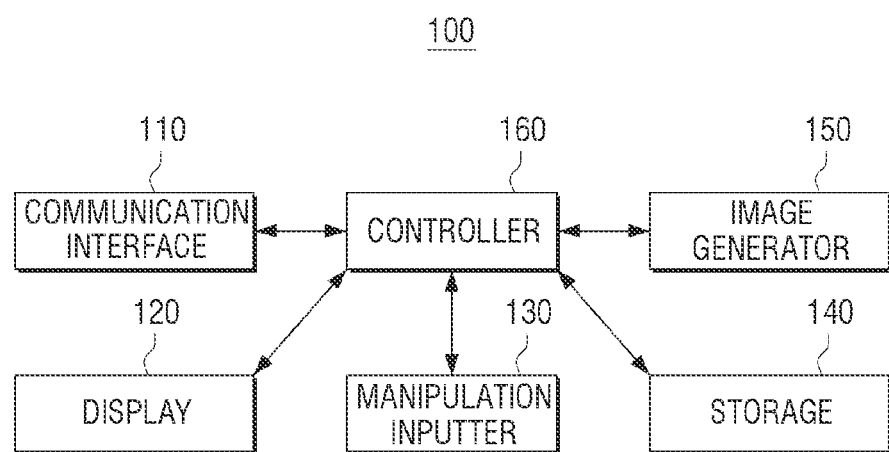
FIG. 3 is a view illustrating an example configuration of the terminal device of FIG. 1.

FIG. 3 is a view illustrating an example configuration of the terminal device of FIG. 1.

Referring to FIG. 3, the terminal device 100 according to an example embodiment may include a communication interface 110, a display 120, a manipulation inputter in, for example, the form of input circuitry 130, a storage 140, an image generator 150, and a controller 160. The terminal device 100 may be a smartphone, a laptop, a Portable Multimedia Player (PMP), an MP3 player, a smart TV, a wearable device (for example, a smart watch), etc.

The terminal device 100 according to an example embodiment may operate as the first terminal device in FIG. 1, and may also operate as the second terminal device. Accordingly, the elements of the terminal device 100 support all of the functions of the first terminal device and the functions of the second terminal device described above. However, the elements of the terminal device 100 may be changed to perform only the functions of the first terminal device or only the functions of the second terminal device.

The communication interface 110 may be configured to connect the terminal device 100 to an external device (specifically, another terminal device and/or a cloud server), and may connect to the external device through a Local Area Network (LAN) and the Internet, and also, may connect to the external device in a wireless communication (for example, as Z-wave, 4LoWPAN, RFID, LTE D2D, BLE, GPRS, Weightless, Edge Zigbee, ANT+, NFC, IrDA, DECT, WLAN, Bluetooth, WiFi, WiFi Direct, GSM, UMTS, LTE, WiBRO, etc.) method, or the like.

In addition, the communication interface 110 may communicate with another terminal device 200. For example, the communication interface 110 may search for another terminal device 200 neighboring the terminal device 100, and may receive or transmit wireless connection information for connecting to another terminal device 200. Herein, another terminal device 200 may, for example, be searched and selected by a single operation. For example, the communication interface 100 may search and select another terminal device 200 through an NFC tag operation with another terminal device 200.

For example, the communication interface 110 may establish NFC communication and/or other wireless connections with another terminal device 200 to exchange data more rapidly. For example, the communication interface 110 may receive wireless connection information (for example, an IP address, a MAC address, etc.) for P2P communication with another terminal device 200 through NFC communication, and establish P2P wireless connection with another terminal device 200 using the received wireless connection information.

In addition, the communication interface 110 may exchange various data with another terminal device 200 connected thereto wirelessly. For example, the communication interface 110 may exchange a series of information (information on an authentication method, authentication information received from the user) for authenticating with respect to another terminal device 200. In addition, when the terminal device 100 operates as another terminal device 200 of FIG. 1, the communication interface 110 may transmit information on the authentication method to terminal device 100 of FIG. 1 or may receive authentication information from terminal device 100 of FIG. 1.

In addition, the communication interface 100 may receive UI information from another terminal device 200. Herein, the UI information may, for example, be information on a background screen of a lock screen set in another terminal device 200, information on a widget displayed on the lock screen, information on a locking method of the lock screen, information on a background screen of a home screen, information on application arrangements on the home screen, information on widget arrangements on the home screen, information on a layout of the home screen, etc. When the terminal device 100 operates as another terminal device 200 of FIG. 1, the communication interface 110 may transmit, to terminal device 100 of FIG. 1, information for setting a UI item selected through the manipulation inputter 130 in terminal device 100 of FIG. 1.

In addition, the communication interface 110 may receive device setting information, contents, and information on applications from another terminal device 200. When the terminal device 100 operates as another terminal device 200 of FIG. 1, the communication interface 110 may provide pre-stored device setting information, contents, and information on applications to terminal device 100 of FIG. 1.

The device setting information may be information on an account which is used in the second terminal device 200, or wireless connection information (for example, WiFi settings, information an AP having the record of being accessed, information for accessing a corresponding AP, etc.). In addition, the contents may, for example, including various contents stored in the second terminal device 200, such as a moving image file, a picture file (or a photo file), a music resource file (example, an MP3 file), a document file (for example, a pdf file). In addition, the information on the applications may be a name of an application installed in the second terminal device 200, an installation file of the application, information on an URL address for receiving the installation file of the application, information on data used in the installed application (for example, information on phone numbers registered at a telephone application, SMS data received at an SMS application, schedule information registered at a schedule application), etc.

In addition, the communication interface 110 may stream image data to another terminal device 200 or may receive streaming from another terminal device 200. For example, the communication interface 110 may receive an image related to a corresponding UI item from another terminal device 200 and display the image to receive selection of the UI item set in another terminal device 200, or may directly receive a screen corresponding to the UI item from another terminal device 200 in a streaming method, and display the screen. In this case, the communication interface 110 may be connected with another terminal device 200 in the P2P method to receive the image data. In addition, the communication interface 110 may receive the above-described data such as content in the P2P connection method state.

In addition, when installation URL information on the application installed in another terminal device 200 is received from another terminal device 200 as application information, the communication interface 110 may access the corresponding URL and receive the application installation file.

In addition, the communication interface 110 may transmit selected UI settings to another terminal device 200. In addition, the communication interface 110 may receive a UI content corresponding to the selected UI settings from another terminal device 200.

For example, when the UI item is a lock screen for example, only an example preview image of the lock screen of the UI settings may be transmitted to the first terminal device 100 in advance, and, in response to the lock screen of the second terminal device 200 being selected to be applied to the first terminal device 100, the first terminal device 100 may request the lock screen image from the second terminal device 200, and receive the lock screen image.

In the above explanation, the UI information and the UI content are separate information. However, according to an example embodiment, the UI content may be included in the UI information and transmitted. For example, when the initially transmitted UI information includes a lock screen image and is transmitted, the first terminal device 100 displays the lock screen image included in the received UI information, and the user selects the lock screen of another terminal device 200 to apply to the first terminal device 100, the already received lock screen image may be applied to the first terminal device 100. When the lock screen is not selected, the first terminal device 100 may delete the already received lock screen image.

The display 120 may display a variety of information supported by the terminal device 100. The display 120 may, for example, be a Liquid Crystal Display (LCD), a Cathode Ray Tube (CRT), etc., and may be implemented by using a touch screen which performs the function of the manipulation inputter or input circuitry 130, which will be described below.

In addition, the display 120 may display a UI screen for setting a state of a language to be used for the operation of the first terminal device 100. Such a UI screen may be displayed when the first terminal device 100 is initially turned on by the user.

In addition, the display 120 may display a UI screen for selecting whether or not to perform the above-described operations. For example, the display 120 may display a UI screen shown in FIG. 4 and may receive a selection of whether or not to perform the above-described UI synchronization and of a synchronization method.

In addition, the display 120 may display a screen for selecting a device to perform UI synchronization. In addition, the display 120 may display a screen for receiving input of authentication information for another terminal device 200. For example, the display 120 may display a UI screen corresponding to authentication method information based on the authentication method information provided by another terminal device 200.

For example, when a pattern authentication method is set in another terminal device 200, the display 120 may display a screen for receiving input of a pattern. In addition, when a number key authentication method is set in another terminal device 200, the display 120 may display a screen for receiving input of a number key. In this case, the screen displayed on the display 120 for authenticating may be the same as the screen on another terminal device 200 for authenticating.

In addition, the display 120 may display a screen for receiving input of account information. For example, when the first terminal device 100 performs UI synchronization with another terminal device 200 which is backed up in a cloud server, the display 120 may display a UI screen for accessing the corresponding cloud server.

In addition, the display 120 may display a plurality of UI items set in another terminal device 200. In this case, the display 120 may display all of the plurality of UI screens on a single screen or may display the plurality of UI items in sequence.

In addition, the display 120 may display image data which is streamed through the above-described communication interface 110. For example, the screen for selecting a UI item may be directly generated by the first terminal device 100 receiving the UI information, or may be generated by another terminal device 200 and provided therefrom. In addition, the screen generated in another terminal device 200 may be provided to the first terminal device 100 in a streaming method, and the display 120 may display the screen received in the streaming method.

In addition, the display 120 may display a list of contents pre-stored in another terminal device 200. In this case, the display 120 may group the contents pre-stored in another terminal device 200 on a basis of predetermined information, and may display the grouped contents, and arrange the groups based on a storage location, frequency of use, type of content, etc. and display the groups. The content may be a photo file, a music file, a moving image file, a document file, etc. as described above.

In addition, the display 120 may display a list of applications installed on another terminal device 200. In this case, the display 120 may arrange and display the applications installed on another terminal device 200 in the order of frequency of use.

In addition, the display 120 may display an object to be synchronized. For example, the display 120 may display an object to be synchronized based on a selected item. In this case, the display 120 may also display a size of data to be transmitted.

In addition, the display 120 may display the progress of the setting synchronization (or new device initialization). For example, much time may be required to exchange data when the user moves the contents pre-stored in another terminal device 200 as well as the UI item to the new terminal device 100. Accordingly, the display 120 may display the progress of data exchange for the user in the process of exchanging data for UI synchronization. In this case, the display 120 may also display a screen introducing the function of the first terminal device 100. Such a function introducing screen may be a normal UI screen which is provided by a manufacturer, or may be a UI screen which is generated by reflecting the contents stored in another terminal device 200 on a screen provided by the manufacturer. For example, when a new camera function of the first terminal device 100 is introduced, an image photographed by the second terminal device 200 may be used as an image content for explaining the corresponding camera function. In addition, when a new music replay function of the first terminal device 100 is introduced, an MP3 file, etc. pre-stored in the second terminal device 200 may be used as a music content for explaining the music replay function.

In addition, the display 120 may display a welcome message. For example, in response to data exchange for UI synchronization being completed, the display 120 may display a welcome message informing that the UI synchronization is completed. The welcome message may include a phrase saying that use of a new device is welcomed, and the display 120 may display a phrase corresponding to a user history in another terminal device 200. For example, when the user has a history of taking photos many times in another terminal device 200, the display 120 may display a welcome message saying "Mr./Ms. ○○○ liking taking photos, we welcome you!"

In addition, the display 120 may display a screen based on the UI set in the terminal device 100. For example, the display 120 may display a UI screen (for example, a lock screen, a home screen, etc.) set by the UI synchronization.

Meanwhile, when the terminal device 100 operates as another terminal device 200 of FIG. 1, the display 120 may display the plurality of UI items set in the terminal device 100 in sequence. In addition, the display 120 may display a list for selecting a content and an application to be transmitted to another terminal device 100 of FIG. 1. In this case, the display 120 may group and display the contents or applications on a basis of predetermined information, or may arrange and display the contents or applications by considering the frequency of replay or frequency of execution.

The manipulation inputter in the form, for example, of input circuitry 130 is provided with a plurality of function keys through which various functions supported by the terminal device 100 are set or selected. The manipulation inputter 130 may, for example, be implemented using a device such as a mouse, a keyboard, etc., and may be implemented using a touch screen which performs the function of the display 120.

In addition, the manipulation inputter 130 may receive input of a power on command of the terminal device 100. In addition, the manipulation inputter 130 may receive selection of UI settings to be applied to the terminal device 100 from among the UIs set in another terminal device 200. In addition, the manipulation inputter 130 may receive selection of a content to be moved to the new terminal device 200 from among the contents stored in another terminal device 200.

When the terminal device 100 operates as another terminal device 200 of FIG. 1, the manipulation inputter 130 may receive selection of UI settings to be applied to terminal device 100 of FIG. 1 from among the UIs set in the terminal device 100.

The storage, or memory, 140 may store a program for driving the terminal device 100. For example, the storage 140 may store a program which is a set of various commands necessary for driving the terminal device 100. The program may include not only an application (or an application program) for providing a specific service, but also an operating program for driving the application.

In addition, the storage 140 may store UI information, device setting information, contents, application information, etc. which are received through the communication interface 110. In addition, the storage 140 may store an application installation file received from a cloud server.

In addition, the storage 140 may store history information. The history information may, for example, include information on the frequency of reproduction of each of the pre-stored contents and the frequency of execution of pre-stored applications.

In addition, the storage 140 may temporarily store image data which is received through the communication interface 110. The storage 140 may be implemented by using a storage medium in the terminal device 100 and/or an external storage medium, for example, a removable disk including a USB memory, a web server connected through a network, etc.

The image generator 150 may generate image data to be displayed on the display 120. In addition, the image generator 150 may generate image data to be displayed on another terminal device 200. For example, the image generator 150 may generate image data to be streamed to another terminal device 200. The image data streamed to another terminal device 200 may be the same as the image displayed on the display 120 or may be different therefrom.

The controller 160 may be configured to control the respective elements of the terminal device 100. For example, in response to the terminal device 100 being initially booted and entering an initial setting stage, the controller 160 may be configured to control the display 120 to display a screen for selecting a driving language. In addition, when the UI synchronization being determined to be performed as in the above-described example embodiment, the controller 160 may be configured to control the display 120 and the manipulation inputter 130 to receive selection of UI settings to be applied to the terminal device 100 from among the UIs set in another terminal device 200. In addition, the controller 160 may be configured to set the UI of the terminal device 100 based on the selected UI settings. Since synchronization can be performed with the terminal device that has been used at the initial driving time of the terminal device (that is, at the initial setting stage) as described above, the user can use the same environment as the existing UI environment in a new terminal without disconnecting from the existing UI environment.

In addition, the controller 160 may be configured to install, in the terminal device 100, an application corresponding to an application installed in another terminal device 200 based on received application data. For example, when the received application data includes an application installation file, the controller 160 may be configured to install the application in the terminal device 100 using the installation file included in the received application data.

On the other hand, when the received application data does not include the application installation file and includes a URL address for downloading the installation file, the controller 160 may be configured to access the corresponding URL address and receive and install the installation file of the corresponding application. In addition, when the received application data includes data which is used in the operation of a specific application (for example, a cache file, backup data, etc.), the controller 160 may be configured to store the data in a location corresponding to the location where the new application is installed, such that the new application installed in the above-described process is operated based on the corresponding data.

When the terminal device 100 functions as another terminal device 200 of FIG. 1, and receives a request for transmission of UI information from another terminal device, the controller 160 may be configured to control the communication interface 110 to transmit information on the UI set in the terminal device 100 as UI information. According to an example embodiment, in order to provide the UI screen set in the terminal device 100 to another terminal device 200, the controller 160 may be configured to control the image generator 150 and the communication interface 110 to generate a screen displaying the plurality of UI items in sequence in the terminal device 100, and to provide the generated screen to another terminal device 200 in the streaming method.

Since the terminal device 100 according to the example embodiments described above is provided with information related to the UI settings of another terminal device from another terminal device 200, and sets the UI, the user can use a new terminal device in the same UI environment as that of the existing terminal device. In addition, since such UI synchronization is performed by user's simple selecting operation on various items, the UI can be easily set by better reflecting user's intention.

In addition, the terminal device 100 according to the example embodiments described above may be connected with another terminal device in the P2P method and directly receive synchronization data, and thus the UI synchronization can be performed swiftly. In addition, when the new terminal device has a sufficient storage space, there is no limit to the amount of data to be transmitted.

In the explanation of FIG. 3, the image generator 150 and the controller 160 are separate elements. However, according to an example embodiment, the function of the image generator 150 and the function of the controller 160 may be integrated into a single configuration.

In the explanation of FIG. 3, the terminal device 100 directly receives the UI information and the contents from another terminal device. However, when back up of a variety of information of another terminal device in a cloud server is performed, the terminal device 100 may receive the UI information and the contents from the cloud server.

FIGS. 4 to 30 are views illustrating various examples of a user interface window which may be displayed on the display of FIG. 3.

Figure 4:
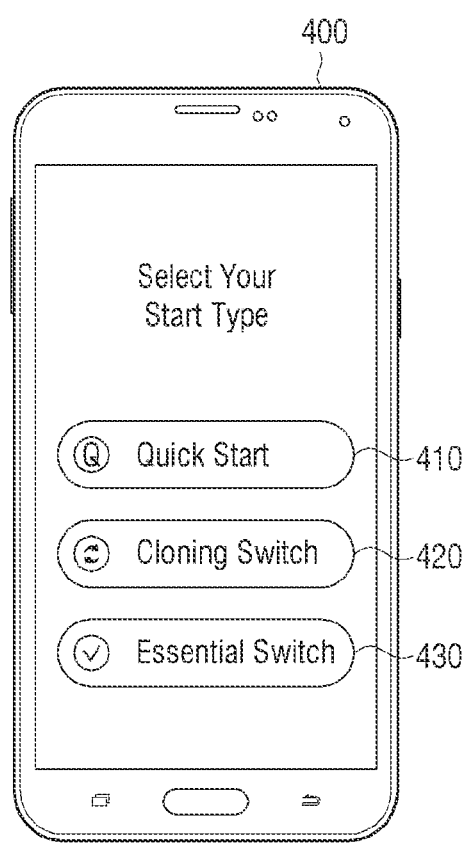

For example, FIG. 4 is a view illustrating an example of a user interface window for receiving selection of whether to perform UI synchronization and of a UI synchronization method.

Referring to FIG. 4, the user interface window 400 includes a quick start area 410, a cloning area 420, and a user selection area (also referred to as an essential switch) 430.

The quick start area (quick start) 410 is an area for receiving a command to directly start the terminal device without performing UI synchronization. For example, the quick start area 410 is an area for receiving selection of a mode in which a home screen is displayed without extra settings after a language is initially set, and the user can freely back up or set. In response to the quick start area 420 being selected by the user, a user interface window shown in FIG. 5 may be displayed.

The cloning area (also referred to as a cloning switch) 420 is an area for receiving input of a command to perform UI synchronization in a cloning mode. The cloning mode may, for example, refer to a UI synchronization mode in which all of the UI items set in an old terminal device are equally applied to a new terminal device. In response to the cloning mode being selected, a device to be synchronized is selected and then data for UI synchronization is exchanged without any item selecting operation. In the above explanation, all of the UI items are applied as they are, but, when the old terminal device and the new terminal device are operated in different operating systems and/or different versions, compatibility may be difficult. For example, when a UI set in the old terminal device cannot be applied to the new terminal device, the UI is not synchronized. As such, in the above-described cloning mode, the data which cannot be driven in a terminal device to which the data is to be transmitted may not be transmitted. That is, the cloning mode is a mode in which all of the UI settings and data compatible with the new terminal device are transmitted.

The user selection area (also referred to as an essential switch) 430 is an area for receiving input of a command to perform UI synchronization. The user selection mode is a UI synchronization mode in which the user selects an item to be applied to a new terminal device from among a plurality of UI items installed in an old terminal device, and applies the selected item. In response to the user selection mode being selected, a device to be synchronized is selected and then user interface windows for receiving selection of a UI item to be synchronized may be displayed as shown, for example, in FIGS. 11 to 20.

Figure 6:
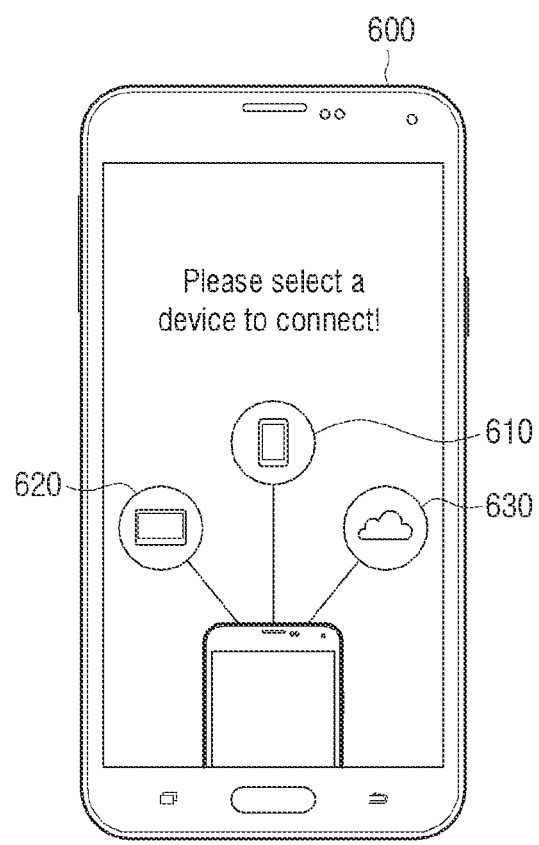

In response to the cloning area 420 and the user selection area 430 being selected, the UI synchronization according to the example embodiments is performed and a user interface window for receiving selection of an object for UI synchronization may be displayed as shown, for example, in FIG. 6.

Figure 5:
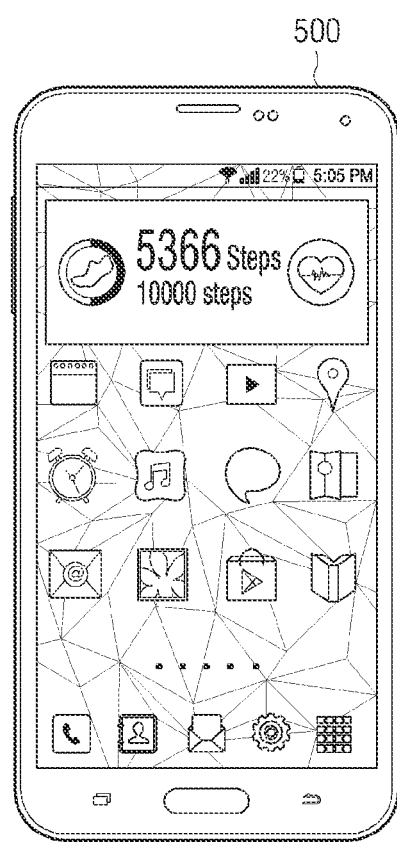

FIG. 5 is a view illustrating an example of a user interface window which is displayed in response to the quick start area 410 of FIG. 4 being selected.

Referring to FIG. 5, the user interface window 500 is a home screen provided by a terminal device. For example, the user interface window 500 may display a UI home screen which is set by a manufacturer as default.

FIG. 6 is a view illustrating an example of a user interface window for receiving selection of a target device to be synchronized for UIs.

Referring to FIG. 6, the user interface window 600 includes a first device area 610, a second device area 620, and a third device area 630.

The first device area 610 is an area for receiving selection of another terminal device of the same type. In response to the first device area 610 being selected, a user interface window for selecting another terminal device to perform UI synchronization with the terminal device 100 and wirelessly connecting may be displayed as shown, for example, in FIG. 7.

The second device area 620 is an area for receiving selection of another terminal device of a different type. In response to the second device area 620 being selected, a user interface window for selecting another terminal device to perform UI synchronization with the terminal device 100 and wirelessly connecting may be displayed as shown, for example, in FIG. 7.

The third device area 630 is an area for receiving input of backup information of a terminal device pre-stored, for example, in a cloud server, and user selection to perform UI synchronization. In response to the third device area 630 being selected, a user interface window for accessing the cloud server may be displayed as shown, for example, in FIG. 10.

Figure 7:
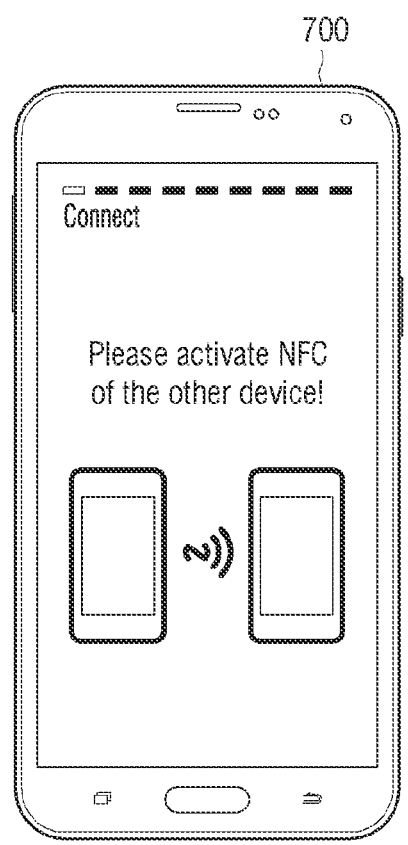

FIG. 7 is a view illustrating an example of a user interface window for receiving selection of a device to perform UI synchronization.

Referring to FIG. 7, the user interface window 700 includes manual information for wirelessly connecting to another terminal device. In the illustrated example, information indicating that NFC of another terminal device needs to be activated is provided.

Accordingly, the user may activate the NFC of another terminal device based on the provided information, and may NFC-tag another terminal device to a new terminal device. Based on the NFC tag, another terminal device 200 and the terminal device 100 may exchange authentication method information and wireless connection information.

Recently, security issues have become more important and security is set in a personal terminal device. Accordingly, a terminal device requires authentication for another terminal device in order to access UIs set in another terminal device and contents stored in another terminal device.

The authentication may, for example, be performed in two methods. The first method is receiving input of authentication information in a new terminal device, and the second method is directly receiving input of authentication information in an old terminal device. The first authentication method will be explained with reference to FIG. 8, and the second authentication method will be explained with reference to FIG. 9.

Figure 8:
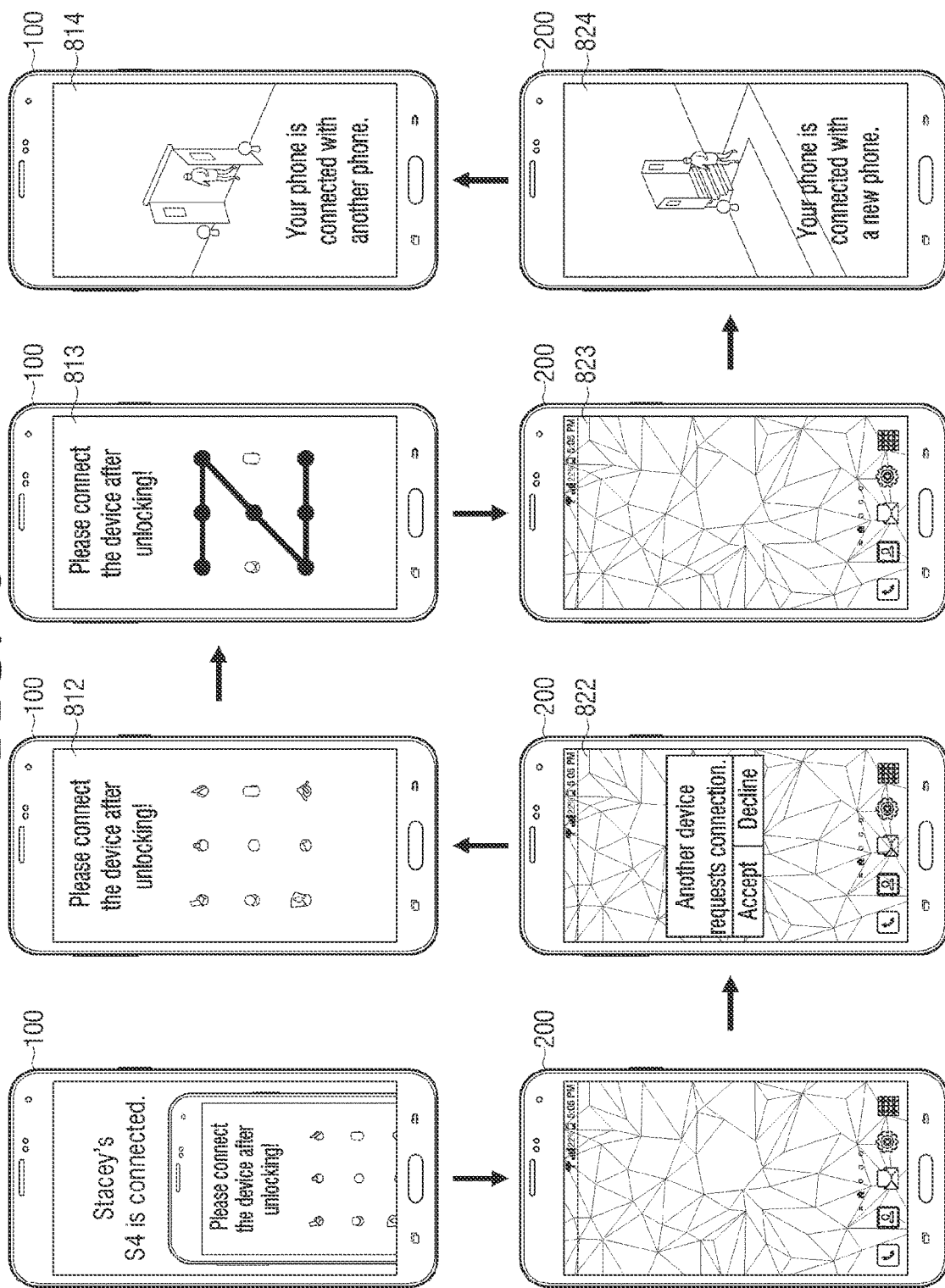

FIG. 8 is a view illustrating an example authentication method for another terminal device.

Referring to FIG. 8, the first terminal device 100 may request information on an authentication method from the NFC-tagged second terminal device 200.

The second terminal device 200, which receives such a request, may display a user interface window 822 informing that authentication is requested from another terminal device 100, and may receive selection of whether or not to accept connection with another device. According to an example embodiment, the operation of displaying the user interface window 822 may be omitted.

After receiving acceptance of connection, the second terminal device 200 may notify the first terminal device 100 of the authentication method of the second terminal device 200. The first terminal device 100 which is notified of the authentication method may display a user interface window 812 for authenticating according to the notified authentication method. For example, when the authentication method of the second terminal device 200 is a pattern method as shown in FIG. 8, the first terminal device 100 may display a user interface window for receiving input of a pattern.

In response to a user pattern 813 being input through the user interface window 812, the first terminal device 100 may transmit the input user pattern to the second terminal device 200 as an authentication key.

The second terminal device 200, which receives the authentication key, performs authentication by comparing the transmitted authentication key and a pre-stored internal authentication key 823. When the transmitted authentication key is identical to the pre-stored authentication key, the second terminal device 200 may determine that the first terminal device 100 is authorized to request the connection.

In addition, the second terminal device 200 may inform the first terminal device 100 that the first terminal device 100 is authenticated 814, and inform the user that the first terminal device 100 and the second terminal device 200 are connected with each other wirelessly 824.

In the above-described example, the first terminal device 100 receives the input of the authentication key for the second terminal device. However, according to an example embodiment, the second terminal device may directly receive the input of the authentication key. This will be explained below with reference to FIG. 9.

Figure 9:
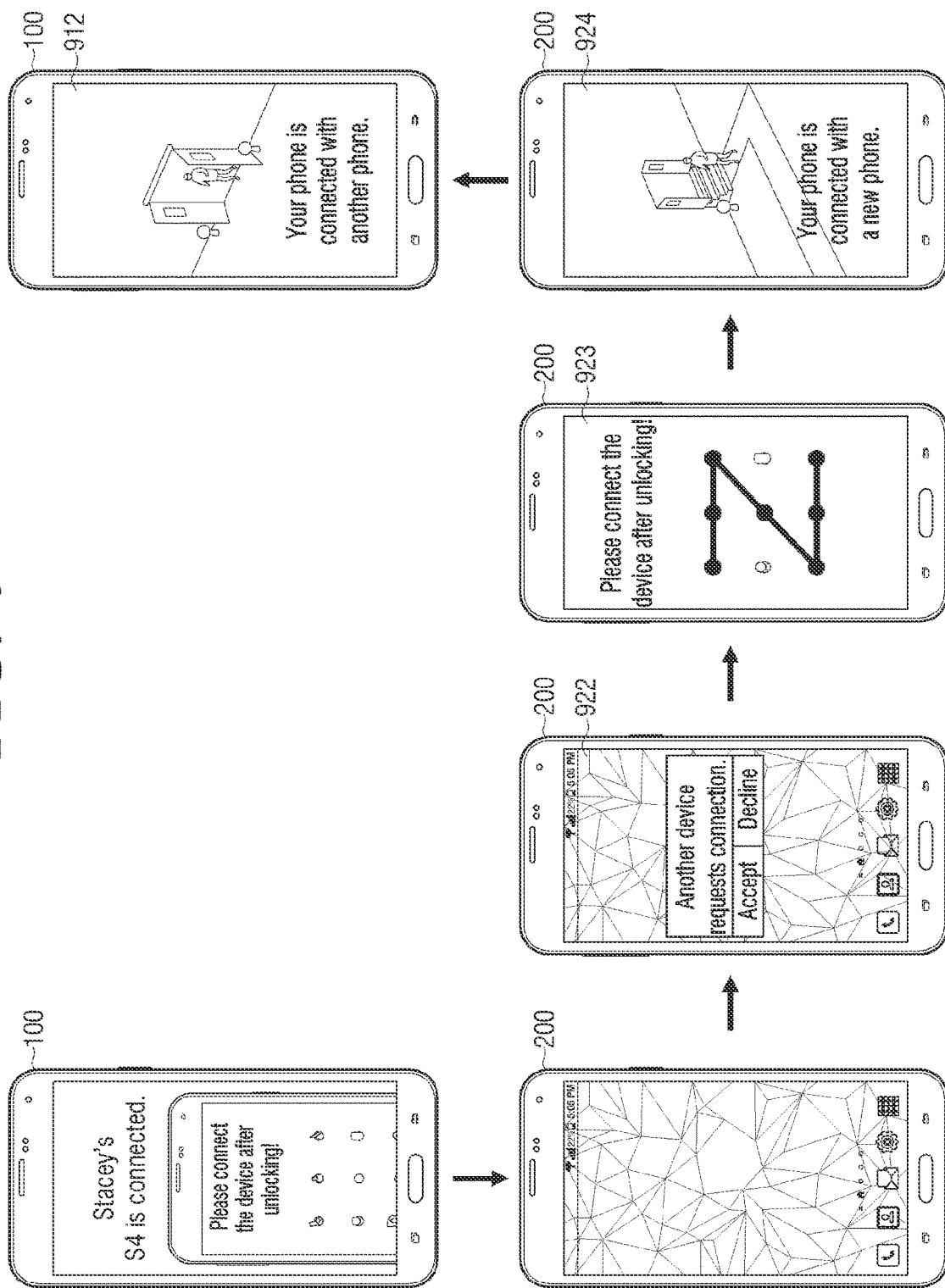

FIG. 9 is a view illustrating an example authentication method for another terminal device.

Referring to FIG. 9, the first terminal device 100 may request the NFC-tagged second terminal device 200 to be connected therewith.

The second terminal device 200, which receives the request for device connection, may display a user interface window 922 informing that authentication is requested from the first terminal device 100, and may receive selection of whether or not to accept connection with another device. In response to connection with another device being accepted, the second terminal device 200 may display a user interface window 923 for authentication of the second terminal device 200.

In addition, in response to an authentication key being input through the user interface window 923, the second terminal device 200 performs authentication by comparing the input authentication key and a pre-stored authentication key, and may determine that the first terminal device 100 is authorized to request the connection.

In addition, the second terminal device 200 may inform the first terminal device 100 that the first terminal device 100 is connected 912, and the first terminal device 100 and the second terminal device 200 may inform the user that the first terminal device 100 and the second terminal device 200 are connected with each other wirelessly 924.

In the explanation of FIGS. 8 and 9, only the pattern input method is illustrated as an example of the authentication method. However, according to an example embodiment, not only a key input method such as inputting a predetermined digit-number key or inputting a password, but also an authentication method using biometric data (for example, a fingerprint, an iris, a vein) may be applied.

Figure 10:
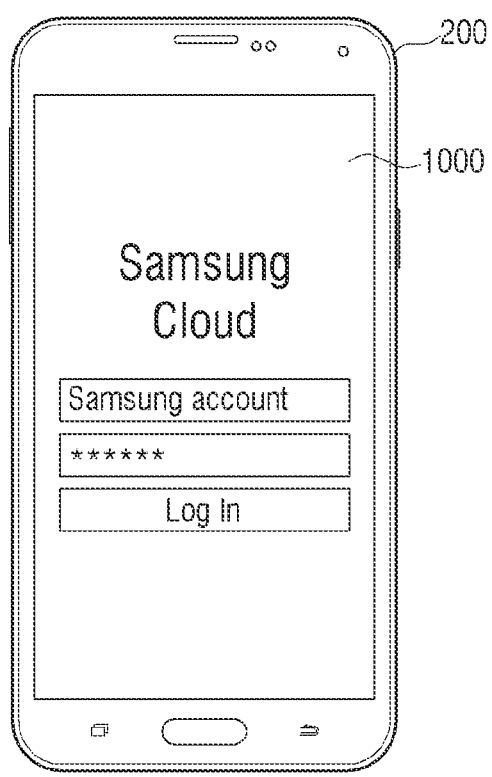

FIG. 10 is a view illustrating an example of a user interface window which is displayed in response to the third device area of FIG. 6 being selected.

Referring to FIG. 10, the user interface window 1000 may include an item for receiving input of login information to access a cloud server which stores backup data of another terminal device 200.

The user may perform authentication to access the cloud server through the user interface window 1000, and perform UI synchronization with respect to the backup data stored in the cloud server.

Figure 11:
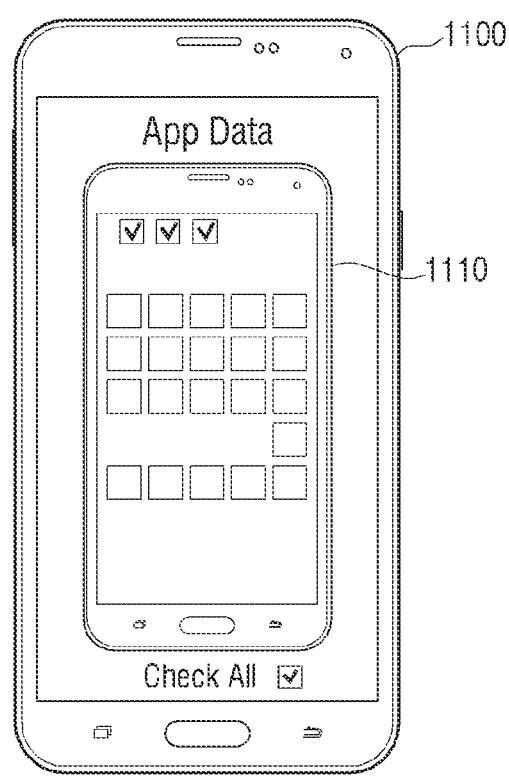
Figure 12:
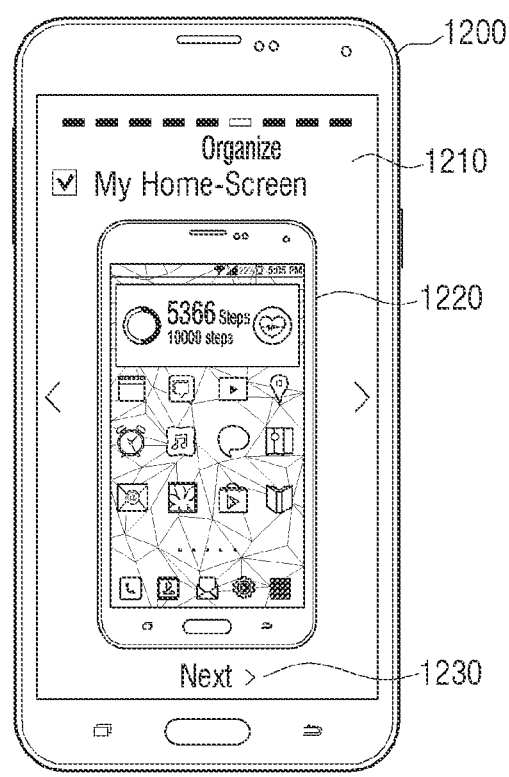

FIGS. 11 and 12 are views illustrating an example of a user interface window for setting a UI to be applied to the terminal device using a screen displayed on the terminal device.

Specifically, FIGS. 11 and 12 are views illustrating an example of a user interface window which displays UI items of another terminal device in a simulation method.

Referring to FIG. 11, the user interface window 1100 includes a simulation area 1110 which displays the screen of a simulated another terminal device. The simulation method refers to displaying a screen which may be displayed on another terminal device 200 on the terminal device 100 other than another terminal device 200, and the terminal device may perform the above-described simulation using transmitted UI information. In addition, the terminal device may display a screen which is transmitted from another terminal device 200 in the streaming method.

The simulation area 1110 is an area for displaying the UI screen set in another terminal device. The simulation area 1110 may be changed to a UI screen of another UI item by user selection.

For example, when the UI item is a home screen, the user interface window 1200 may include a first area 1210, a second area 1220, and a third area 1230 as shown in FIG. 12.

The first area 1210 is an area for displaying the name of the UI item displayed on the second area 1220. In the illustrated example, since the second area 1220 displays the home screen, the first area 1210 displays a message indicating a home screen.

The second area 1220 is an area for displaying a UI image applied to the second terminal device 200. For example, the second area 1220 may render and display a UI image based on the UI information provided by the second terminal device 200, or may display a screen which is provided by the second terminal device 200 in the streaming method.

The third area 1230 is an area for receiving input of a command to change the UI item. In response to the third area 1230 being selected, the name and the image displayed on the first area 1210 and the second area 1220 may be changed to another item and another item image.

In the example embodiment of FIGS. 11 and 12, another terminal device does not need to display a screen. Therefore, when the liquid crystal of a terminal device that the user has used is broken or is out of order, the user can identify the UI image of the existing terminal device in a new terminal device and can select a UI item to be applied to the new terminal device.

Figure 13:
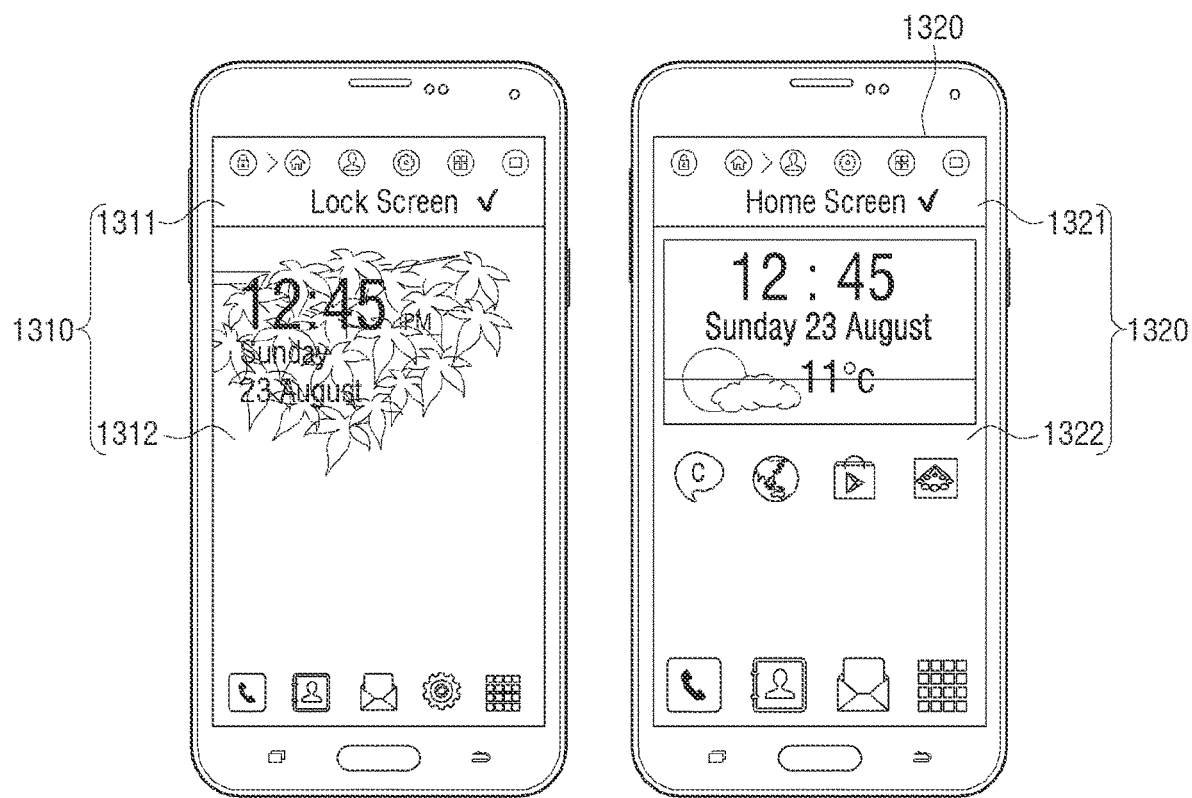

FIG. 13 is a view illustrating an example of another UI item which is displayed on the second area of FIG. 12.

Referring to FIG. 13, the user interface window 1310 is an example of a lock screen. In addition, the user interface window 1320 is an example of a home screen The user interface window 1310 includes an area 1311 displaying the UI item of the lock screen, and an area 1312 displaying the lock screen set in the second terminal device.

Although not shown in FIG. 13, the user interface window 131 may display a predetermined pattern for receiving input of authentication information. Accordingly, when the user sets the UI item of the lock screen of the second terminal device 200 to be applied to the first terminal device 100, the first terminal device 100 may have the same lock screen and the same lock method as the second terminal device. For example, even when the user does not set separate authentication setting in the new terminal device 100, the same authentication setting as the old terminal device 200 may be set in the new terminal device 100.

The user interface window 1320 includes an area 1321 displaying the UI item of the home screen, and an area 1322 displaying the home screen set in the second terminal device. Accordingly, when the user sets the UI item of the home screen of the second terminal device 200 to be applied to the first terminal device 100, the first terminal device 100 may have the same home screen background screen, the same home widget, and the same application arrangements as the second terminal device 100.

Figure 14:
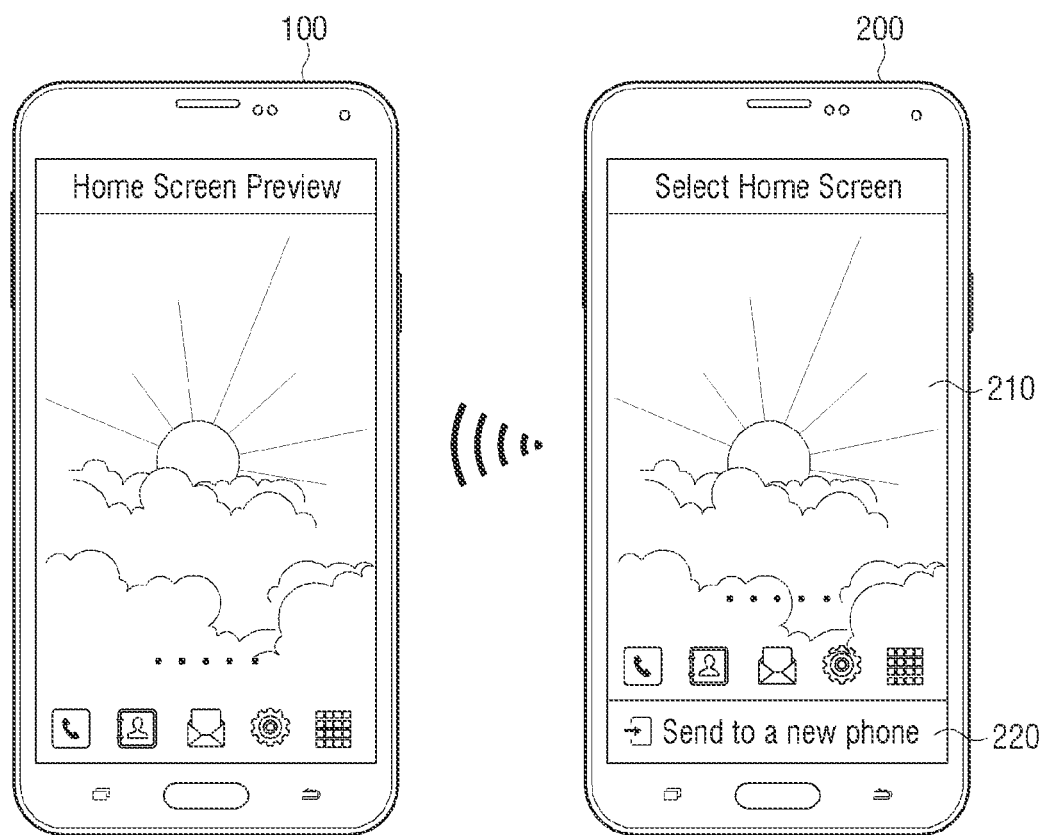

FIG. 14 is a view illustrating an example of a user interface window through which the user sets a UI to be applied to the terminal device using a screen displayed on another terminal device.

Referring to FIG. 14, the second terminal device 200 includes an area 210 displaying a predetermined UI item, and a selection area 220 to transmit the corresponding item to the first terminal device 100. For example, the user may set whether or not to apply the UI item displayed on the second terminal device 200 to the first terminal device 100 through the selection area 220.

In response to the selection area 220 being selected, the first terminal device 100 may display a preview screen regarding the current UI item. In the illustrated example, the first terminal device 100 and the second terminal device 200 have the same size. However, according to an example embodiment, the first terminal device 100 and the second terminal device 200 may have different display screens and different resolutions. Accordingly, the user may identify and select whether or not to apply the UI item of the second terminal device 200 to the first terminal device 100 more intuitively through the preview screen displayed on the first terminal device 100.

In the explanation of FIG. 14, in response the UI item to be transmitted being selected in the second terminal device 200, the preview screen of the corresponding UI item is displayed on the first terminal device 100. However, according to an example embodiment, a UI image corresponding to the UI item displayed on the second terminal device 200 may be automatically displayed on the first terminal device 100, and the user may identify the screen displayed on the first terminal device 100 and determine whether or not to apply the displayed UI item to the first terminal device 100.

Figure 15:
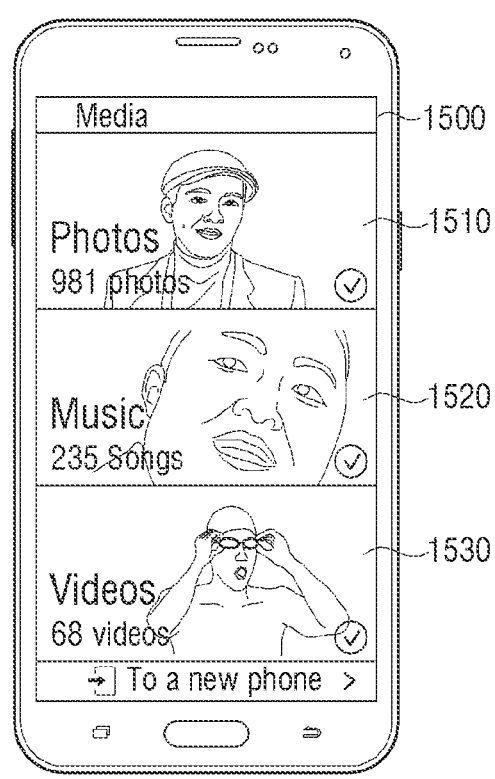

FIG. 15 is a view illustrating an example of a user interface window which displays a list of contents stored in another terminal device.

Referring to FIG. 15, the user interface window 1500 displays the number of contents to be transmitted from another terminal device 200. As shown in FIG. 15, the user interface window 1500 may display the number of contents to be transmitted according to a type of content, such as, for example, a photo area 1510, a music area 1520, and a video area 1530.

The photo area 1510 may, for example, be an area for displaying the number of photo files to be transmitted from another terminal device 200. In an initial state in which the user does not separately select a photo file to be synchronized, the photo area 1510 may display the total number of photo files stored in another terminal device 200. In this case, the user may adjust the number of photo files to be transmitted by selecting the photo area 1510. For example, in response to the photo area 1510 being selected, a user interface window shown in FIG. 16 may be displayed.

The music area 1520 may, for example, be an area for displaying the number of sound source files to be transmitted from another terminal device 200. In an initial state in which the user does not separately select a sound source file to be synchronized, the music area 1520 may display the total number of sound source files stored in another terminal device 200. In this case, the user may adjust the number of sound source files to be transmitted by selecting the music area 1520. For example, in response to the music area 1520 being selected by the user, a user interface window shown in FIG. 17 or 18 may be displayed.

The video area 1530 may, for example, be an area for displaying the number of video files to be transmitted from another terminal device 200. In an initial state in which the user does not separately select a video file to be synchronized, the video area 1530 may display the total number of video files stored in another terminal device 200. In this case, the user may adjust the number of video files to be transmitted by selecting the video area 1530. For example, in response to the video area 1530 being selected by the user, a user interface window shown in FIG. 19 may be displayed.

In FIG. 15, the photo file, the video file, and the sound source file are illustrated as types of contents to be transmitted. However, according to an exemplary embodiment, a document file such as PDF or XPS or an ebook file such as EPUB may be used.

In addition, in the above explanation, an address and SMS data are UI-synchronized as data regarding an application. However, according to an example embodiment, the address and the SMS data may be processed as a synchronization item which is the same as the above-described content item.

Figure 16:
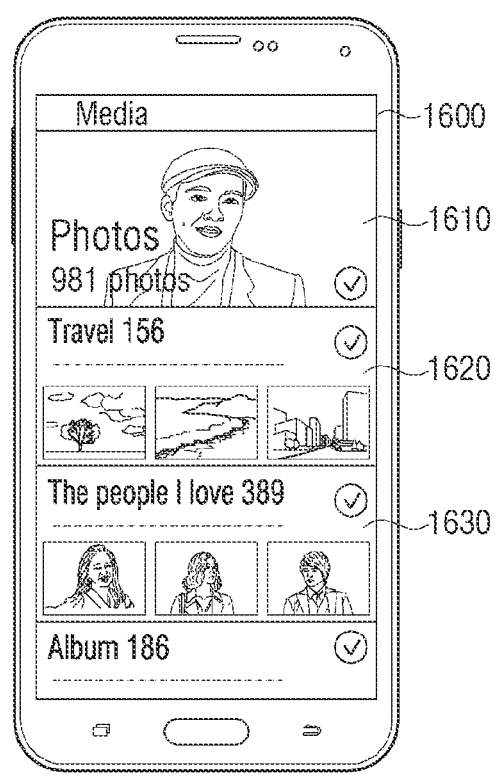

FIG. 16 is a view illustrating an example of a user interface window which is displayed in response to the photo area of FIG. 15 being selected.

Referring to FIG. 16, the user interface window 1600 includes an abstract area 1610 displaying information of a selected photo file, and a plurality of item areas 1620 and 1630.

The abstract area 1610 may, for example, be an area for displaying the number of photo files to be synchronized.

The plurality of item areas 1620 and 1630 may, for example, be areas for displaying the plurality of photo files grouped in a predetermined unit. For example, the plurality of photos may be divided into photos which are directly generated, and photos which are downloaded through a mail or an SNS. In addition, the directly taken photos may be classified by photographing locations, and the downloaded photos may be classified by applications in which photos are acquired. In this state, the user may wish to synchronize only the directly taken photos or may wish to synchronize only the photos taken in a specific location from among the directly taken photos. Accordingly, in the example embodiment, the plurality of photos are grouped in the predetermined unit, and the respective groups may be displayed in the above-described item areas.

In the illustrated example, the user interface window includes only two item areas. However, according to an example embodiment, the user interface window may include two or more areas. In addition, each of the items may have a plurality of sub items thereunder. As such, in response to one of the above-described item areas being selected, sub items of the corresponding item may be displayed.

Figure 17:
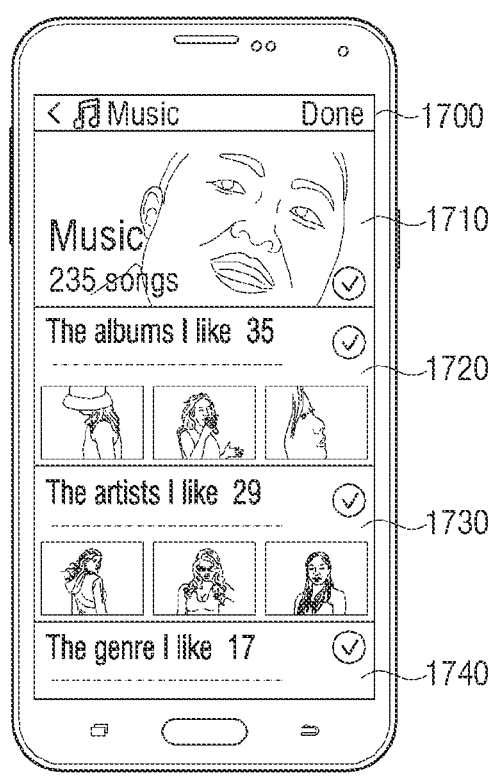
Figure 18:
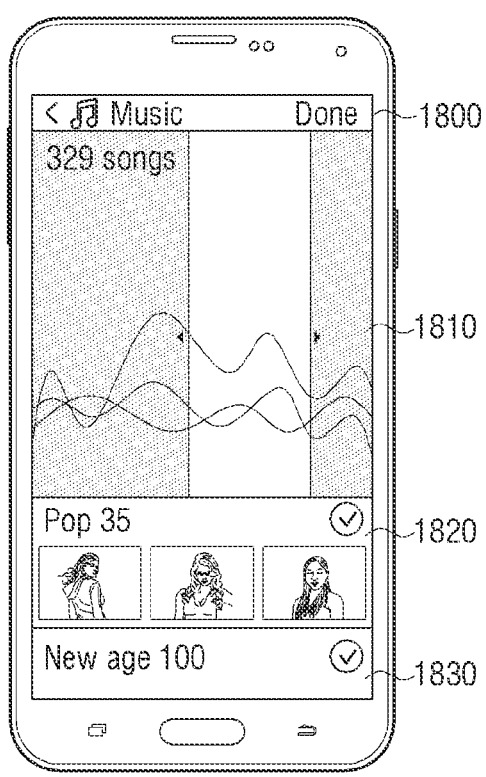

FIGS. 17 and 18 are views illustrating examples of a user interface window which is displayed in response to the music area of FIG. 15 being selected.

Referring to FIGS. 17 and 18, the user interface windows 1700, 1800 includes an abstract area 1710 or 1810 displaying information of a selected sound source file, and a plurality of item areas 1720, 1730 1740, 1820 and 1830.

The abstract area 1710 may, for example, be an area for displaying the number of sound source files to be synchronized. The abstract area 1710 may display not only the information on the number of sound source file as shown in FIG. 17, but also a graph which classifies the selected sound source files by genre and period and illustrates characteristics thereof as shown, for example, in FIG. 18.

The plurality of item areas 1720, 1730, 1740, 1820, 1830 may, for example, be areas for displaying the plurality of sound source files grouped in a predetermined unit. For example, the plurality of sound sources may be classified by artists or album/genre/bit/releasing time, etc. In addition, the user may transmit only the sound sources of a specific artist or transmit only specific genre. Accordingly, in the example embodiment, the plurality of sound source files are grouped in the predetermined unit, and the respective groups may be displayed in the above-described item areas.

Figure 19:
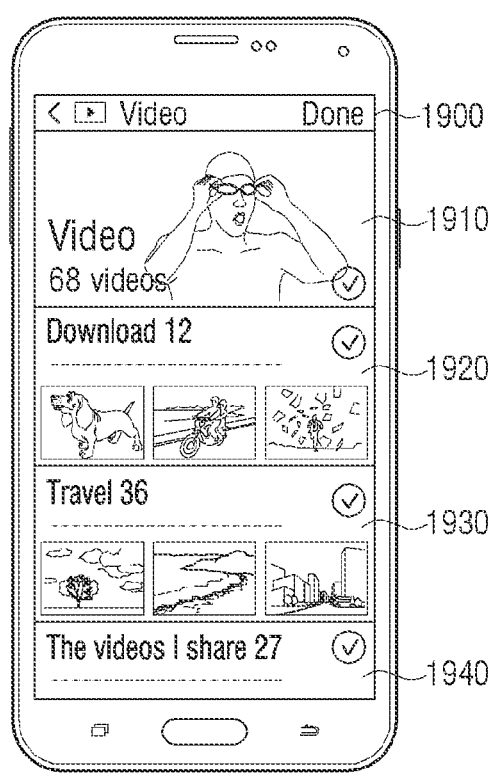

FIG. 19 is a view illustrating an example of a user interface window which is displayed in response to the video area of FIG. 15 being selected.

Referring to FIG. 19, the user interface window 1900 includes an abstract area 1910 displaying information of a selected video file, and a plurality of item areas 1920, 1930, 1940.

The abstract area 1910 may, for example, be an area for displaying the number of video files to be synchronized.

The plurality of item areas 1920, 1930 and 1940 are areas for displaying the plurality of video files grouped in a predetermined unit. For example, the plurality of video files may be divided into video files which are directly generated by the user, and video files which are downloaded such as movies. In addition, the movies may be classified by genres. In addition, the user may synchronize only the videos directly generated by the user. Accordingly, in the example embodiment, the plurality of video files are grouped in the predetermined unit, and the respective groups may be displayed in the above-described item areas. According to an example embodiment, the group may be divided into a plurality of sub groups.

In the example embodiment described above, the contents stored in the second terminal device 200 are not transmitted as they are, and an environment in which the user can select only the content that the user wishes to synchronize can be provided. Therefore, the user can summarize the user's previous experiences, and can back up only the necessary experience in the new device from among the summarized experiences.

Figure 20:
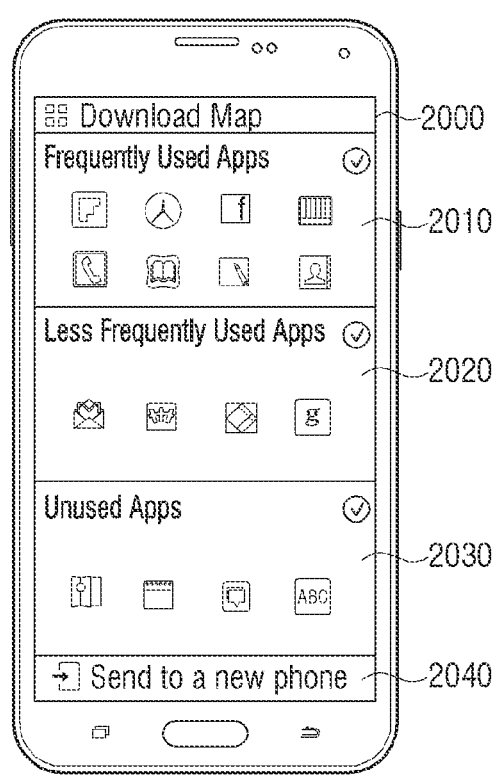

FIG. 20 is a view illustrating an example of a user interface window which displays a list of applications installed in another terminal device.

Referring to FIG. 20, the user interface window 2000 divides the plurality of applications installed in another terminal device into a plurality of areas 2010, 2020, and 2030 according to the frequency of use by the user.

Since the plurality of applications are not displayed in the form of a simple list, and are displayed according to the frequency of use, the user can easily select an application to be applied to the new first terminal device 100.

The user may select an application to be applied to the first terminal device 100 using the list of the applications arranged in the order of the frequency of use. In addition, in response to a selection completion area 2040 being selected, the application selected from the applications installed in the second terminal device 200 may be installed in the first terminal device 100.

In this case, when there is an installation file for the selected application, the second terminal device 200 may provide the installation file to the first terminal device 100. Alternatively, the second terminal device 200 may generate an installation file based on a file on the selected application, and provide the generated installation file to the first terminal device. Alternatively, the second terminal device 200 may provide URL information for downloading the installation file for the selected application to the first terminal device 100.

Accordingly, the first terminal device 100, which receives the installation file, may install the selected application using the received installation file. On the other hand, when the URL information is received, the first terminal device 100 may acquire the installation file using the URL information, and install the selected application using the acquired installation file.

In addition, additional information related to the application selected in the second terminal device 200 (for example, information on phone numbers of a telephone application, SMS data exchanged in an SMS application, information on a result of a game of a game application, and replay history data of a music application) may be synchronized between the second terminal device 200 and the first terminal device 100.

Figure 21:
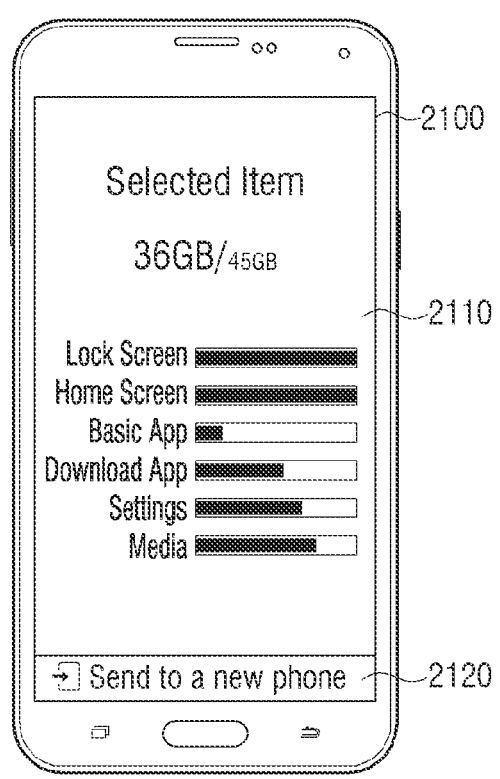

FIG. 21 is a view illustrating an example of a user interface window which displays an object to be synchronized.

Referring to FIG. 21, the user interface window 2100 includes an abstract area 2110 regarding an object to be synchronized, and a synchronization start area 2120.

The abstract area 2110 is an area for displaying items to be UI-synchronized and data size of the respective items.

The synchronization start area 2120 is an area for receiving input of a start command to really transmit the selected data. In response to the synchronization start area 2120 being selected, the first terminal device 100 receives the items which are selected in the prior process from the second terminal device 200. In this case, the first terminal device 100 may display a new function of the first terminal device 100. In addition, the first terminal device 100 may display the new function using contents and/or application data stored in the second terminal device 200. This will be explained below with reference to FIGS. 22 to 25.

FIGS. 22 to 25 are views illustrating examples of a user interface window which displays a function of a terminal device.

Figure 22:
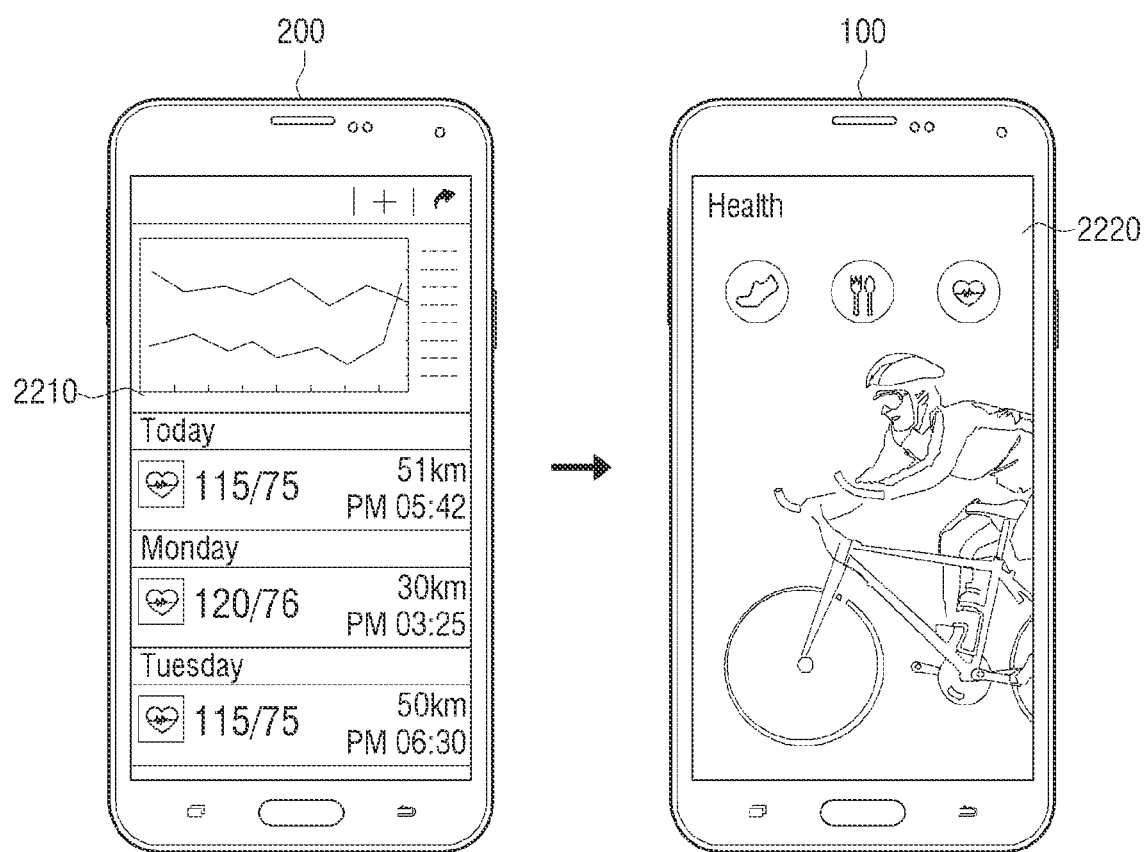

For example, FIG. 22 is a view showing an example of a user interface window which explains the function of the new terminal device 100 using data of an application installed in the old terminal device 200.

Referring to FIG. 22, when an application related to a bike is installed in the old terminal device 200 and an exercise function of the new terminal device 100 needs to be explained, the user interface window 2220 explains the exercise function of the new terminal device using a bike screen related to the application of the old terminal device 200 reflected in window 2210.

Figure 23:
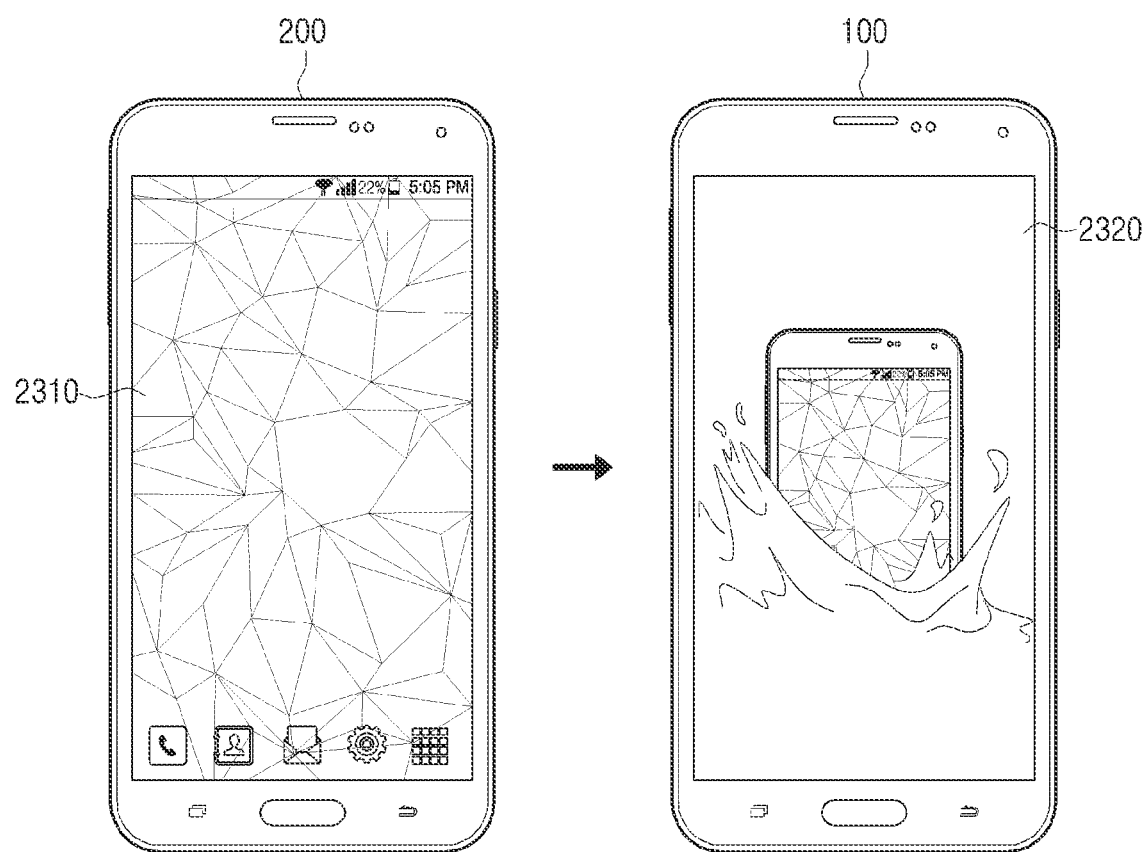

FIG. 23 is a view illustrating an example of a user interface window which displays a new function using a UI screen installed in the old terminal device.

Referring to FIG. 23, when a waterproof function of the new terminal device 100 needs to be explained, the user interface window 2320 may explain the new function by reflecting the home screen 2310 of the old terminal device 200 on the screen explaining the waterproof function.

Figure 24:
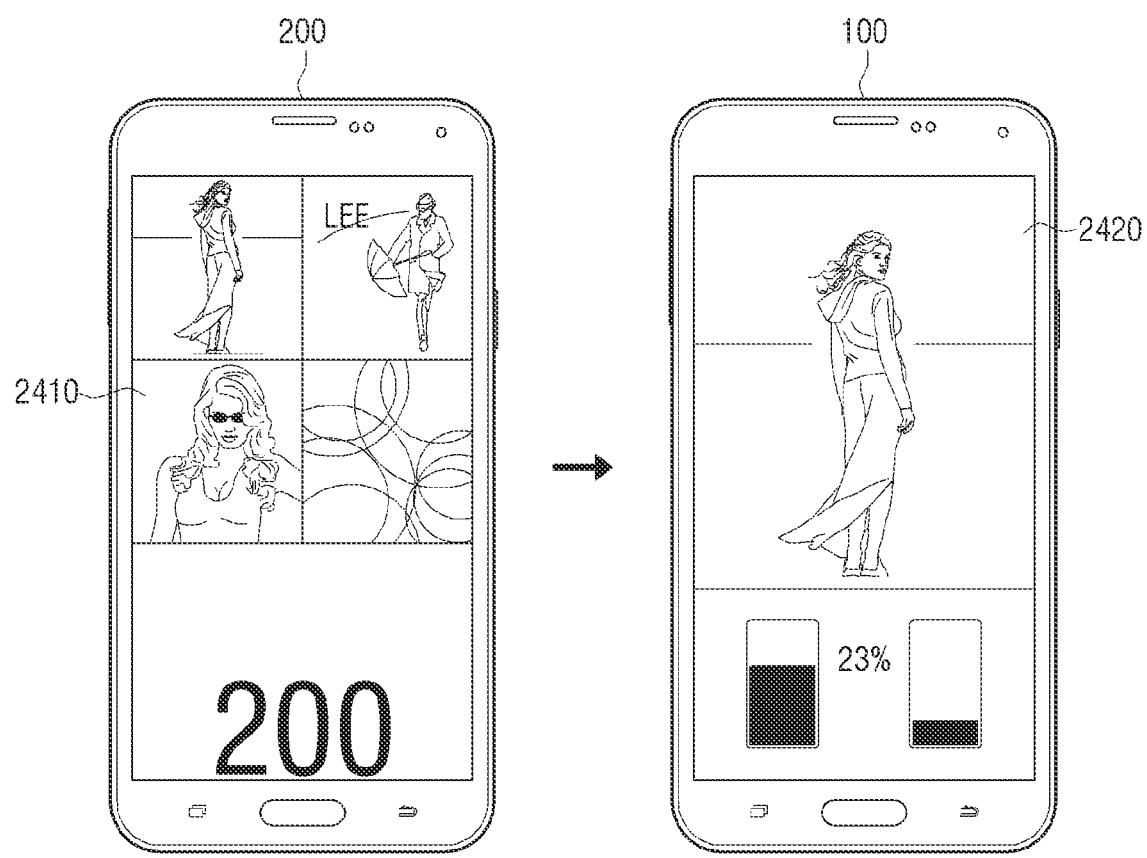

FIG. 24 is a view illustrating an example of a user interface window which displays a new function using a sound source content installed in the old terminal device.

Referring to FIG. 24, when a new sound function of the new terminal device 100 needs to be explained, the user interface window 2420 may explain the new sound function using the sound source content stored in the old terminal device 200 illustrated in window 2410. In addition, when a new function of the new terminal device unrelated to sound source replay is explained, the new terminal device may reproduce a sound source file which has been frequently reproduced in the old terminal device 200 as background music.

Figure 25:
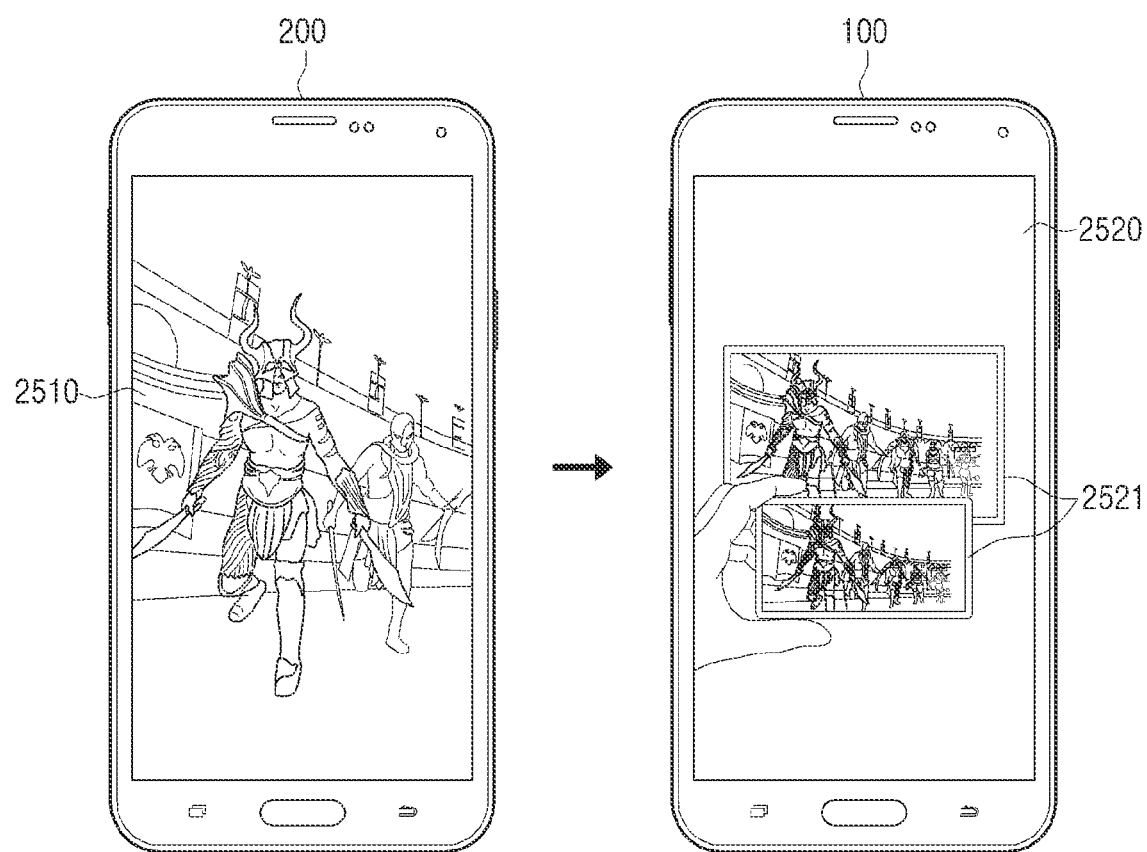

FIG. 25 is a view illustrating an example of a user interface window which displays a new function using a video content installed in the old terminal device.

Referring to FIG. 25, when a mirroring function of the new terminal device 100 needs to be explained, the user interface window 2520 may explain the new mirroring function using the screen 2510 of the video content stored in the old terminal device 200 and displaying it on an area 2521 of the screen of the new terminal device 100.

FIGS. 26 to 29 are views illustrating various examples of a welcome message.

Figure 26:
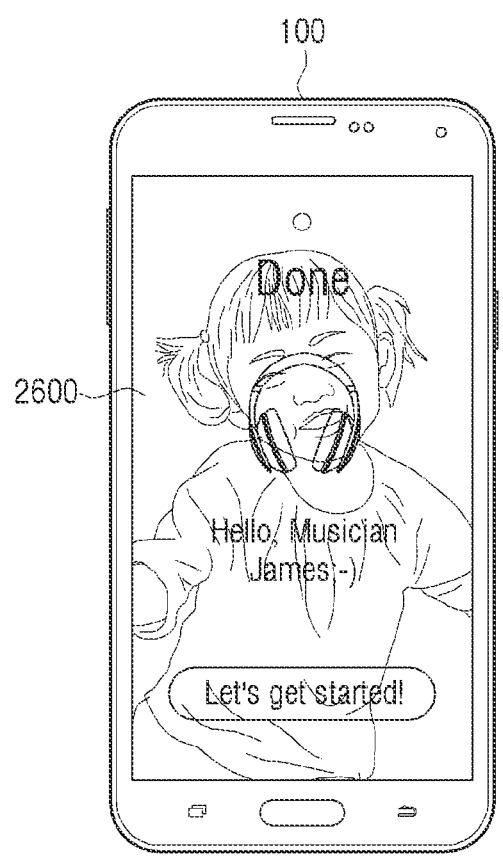

Referring to FIG. 26, a user interface window 2600 displays a message informing that UI synchronization is completed. The displayed message may be a message considering history information of a transmitted content. For example, when the user frequently drives a sound source replay application in the second user terminal device 200, the user interface window 2600 may display a message saying "Mr./Ms. ○○○ liking music, nice to meet you!" or "Hello, Musician James :-)" while reproducing a sound source of a high frequency of reproduction.

Figure 27:
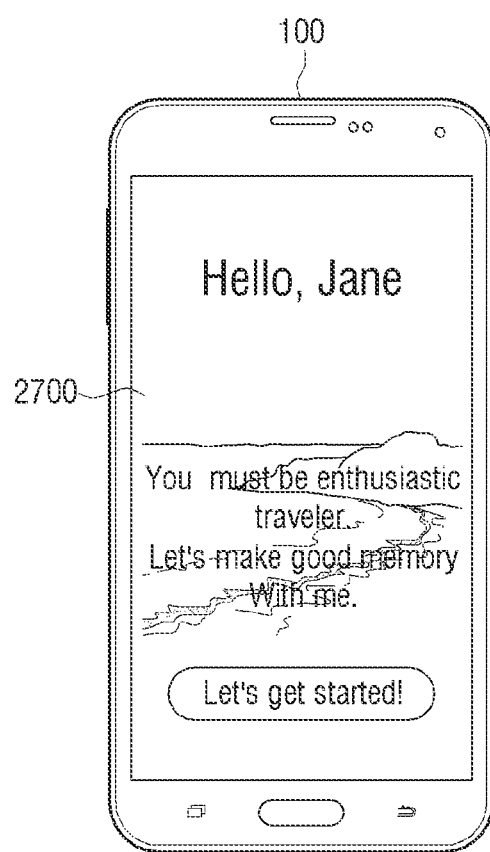

Referring to FIG. 27, when a transmitted file has many files of photos taken in various locations, a user interface window 2700 may display a message saying "Mr./Ms. ○○○ liking traveling, nice to meet you!" or "Hello, Jane You must be enthusiastic traveler. Let's make good memory with me." while displaying one of the photo files created by the user.

In the above-described examples, the welcome message is displayed on a single screen. However, according to an example embodiment, the welcome message configured of a plurality of screens may be displayed. This welcome message may be called "playback."

Figure 28:
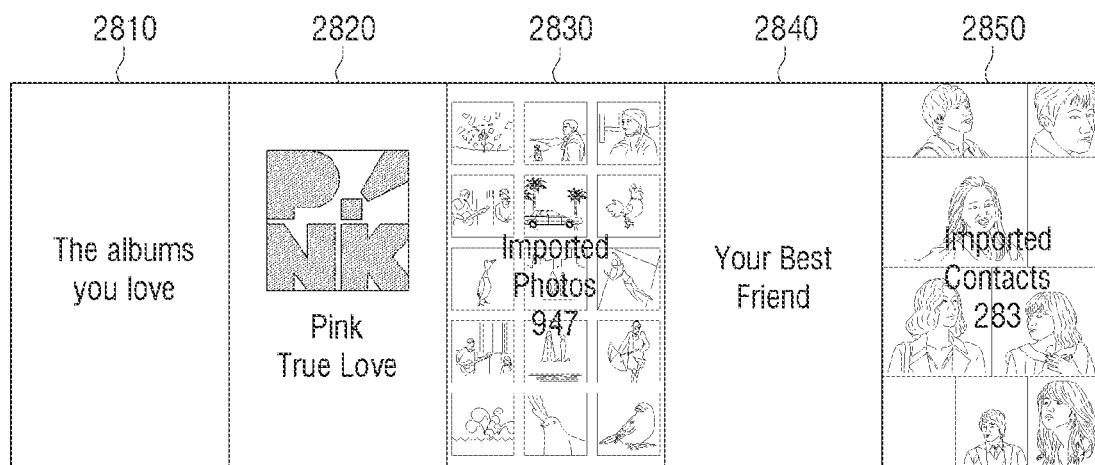

For example, referring to FIGS. 28 and 29, the first terminal device 100 may analyze contents provided by the second terminal device 200, summarize the user's experiences in the second terminal device by displaying user's favorite music albums 2810, 2820, 2910, 2920, photos 2830, 2930, and contacts information 2840, 2850, 2940, 2950 using a series of moving images, and provide the summarized experiences.

Figure 30:
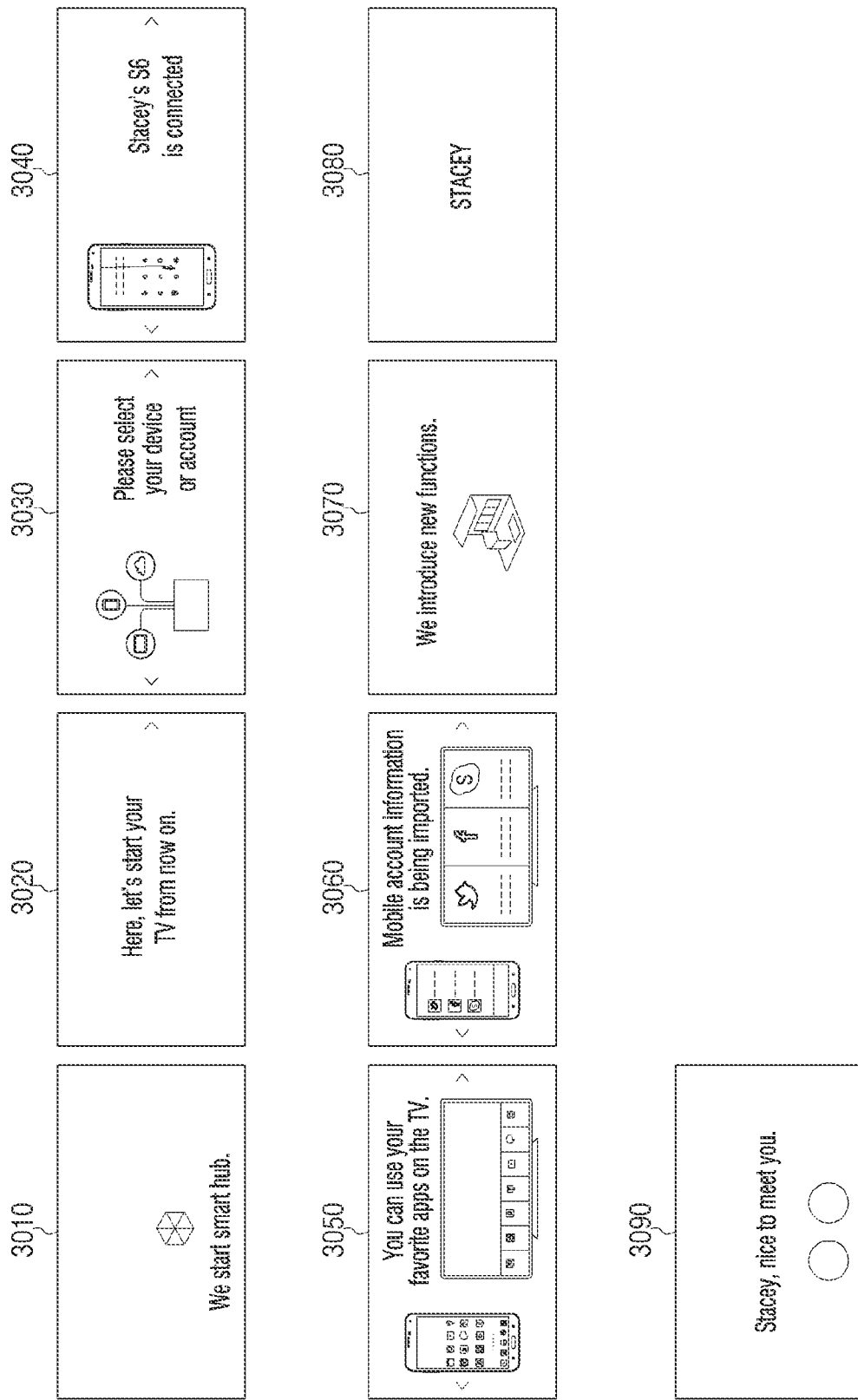

FIG. 30 is a view illustrating various examples of a user interface window which is displayed when the disclosure is applied to a digital TV.

Referring to FIG. 30, in response to the digital TV being initially turned on, a user interface window 3010 or 3020 informing initial driving may be displayed.

In addition, a user interface window 3030 for receiving selection of a device to perform UI synchronization with the digital TV may be displayed. In addition, in response to the terminal device to be connected being selected, a user interface window 3040 displaying information on the selected terminal device may be displayed.

In addition, items to be applied to the digital TV are selected from among UIs, applications, etc. set in the selected terminal device (3050, 3060).

While the item set in the digital TV is selected and data on the selected items is transmitted from the terminal device, the digital TV may introduce a new function to the user (3070). In addition, in response to the UI synchronization being finished, the digital TV may display a welcome message 3080 or 3090 based on transmitted information.

Figure 31:
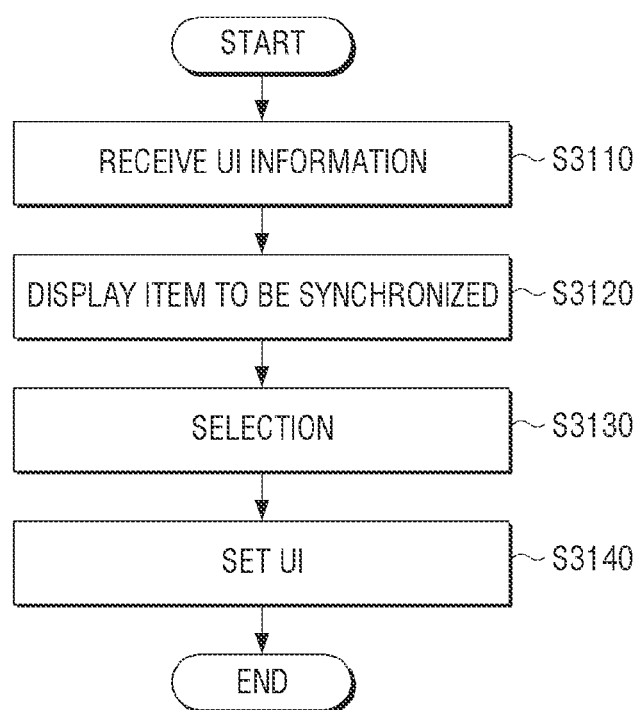
FIG. 31 is a view illustrating an example method for controlling a terminal device.

FIG. 31 is a view illustrating an example method for controlling of a terminal device.

Referring to FIG. 31, the terminal device receives UI information set in another terminal device (S3110). The UI information recited herein may, for example, be at least one of information on a background screen of a lock screen, information on a widget of the lock screen, information on a locking method of the lock screen, information on a background screen of a home screen, information on application arrangements on the home screen, and information on widget arrangements on the home screen.

In addition, the terminal device displays a plurality of UI items set in another terminal device based on the received UI information (3120). In addition, the terminal device receives selection of whether or not to apply each of the UI items to the terminal device (S3130). For example, the terminal device may display a screen for receiving selection of data to be stored or set in the terminal device from among the data on the contents set or stored in another terminal device according to an item. In addition, through the displayed screen, data to be stored or set in the terminal device is selected for each item. The synchronization items may be the above-described UI items, applications, contents, and device setting information.

In addition, the terminal device sets a UI of the terminal device based on the selected UI settings (S3140). For example, the terminal device may receive a UI content corresponding to the selected UI item from another terminal device, and set the received UI content in the terminal device.

Since the method of controlling according to the above-described example embodiment provides an environment in which various UIs and contents set in another terminal device can be easily selected and applied, the user can easily set the same environment as the environment that the user has used in an existing device in a new terminal device. In addition, since such an installing operation can be performed by user's simple selecting operation on various items, the synchronization can be performed by better reflecting user's intention. The method of controlling shown in FIG. 31 may be executed in the terminal device having the configuration of FIG. 3 or may be executed in terminal devices having other configurations.

In addition, the above-described method of controlling may be implemented as an operating system or an application including an executable algorithm which can be executed in a computer. The program may be stored in a non-transitory computer readable medium and provided.

Figure 32:
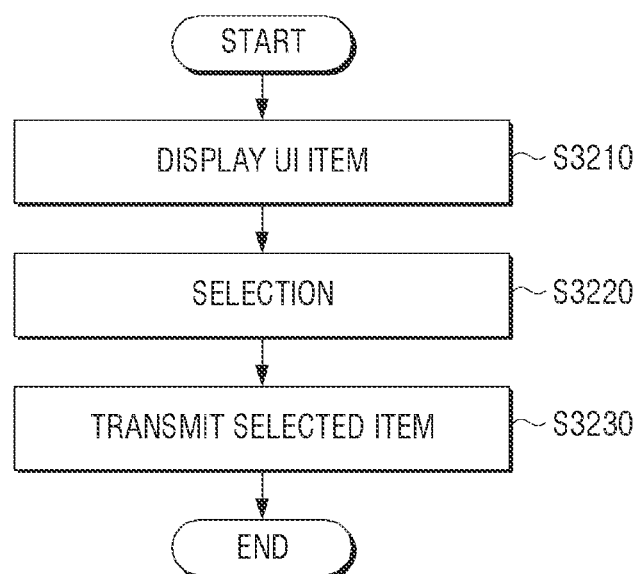
FIG. 32 is a view illustrating an example method of controlling of a terminal.

The non-transitory computer readable medium refers to a medium that stores data semi-permanently rather than storing data for a very short time, such as a register, a cache, a memory or etc., and is readable by an apparatus. Specifically, the above-described various applications or programs may be stored in the non-transitory computer readable medium such as a compact disc (CD), a digital versatile disk (DVD), a hard disk, a Blu-ray disk, a universal serial bus (USB), a memory card, a ROM or etc., and may be provided FIG. 32 is a view to illustrating an example method of controlling a terminal. For example, FIG. 32 illustrates an example embodiment in which the second terminal device of FIG. 1 selects a UI item installed in the first terminal device and provides the selected UI item to the first terminal device.

Referring to FIG. 32, the terminal device displays a plurality of UI items set in the terminal device in sequence (S3210). For example, the terminal device displays a screen for receiving selection of data to be transmitted to another terminal device from among the UI settings and/or contents set or stored in the terminal device according to an item. The synchronization items may be the above-described UI items, applications, contents, device setting information.

In addition, the terminal device receives selection of whether to apply each of the displayed UI items to another terminal device or not (S3220).

In addition, the terminal device transmits information for setting the selected UI item in another terminal device to another terminal device (S3230).

Since the method for controlling according to the above-described example embodiment provides the information on the UI item set in the device to another terminal device, the user can easily set the same environment as the environment that the user has used in an existing device in a new terminal device. In addition, since such an installing operation is performed in the existing device which can be easily manipulated by the user, the user can easily perform synchronization. The method of controlling shown in FIG. 32 may be executed in the terminal device having the configuration of FIG. 3 or may be executed in terminal devices having other configurations.

In addition, the above-described method of controlling may be implemented as an operating system or an application including an executable algorithm which can be executed in a computer. The program may be stored in a non-transitory computer readable medium and provided.

Figure 33:
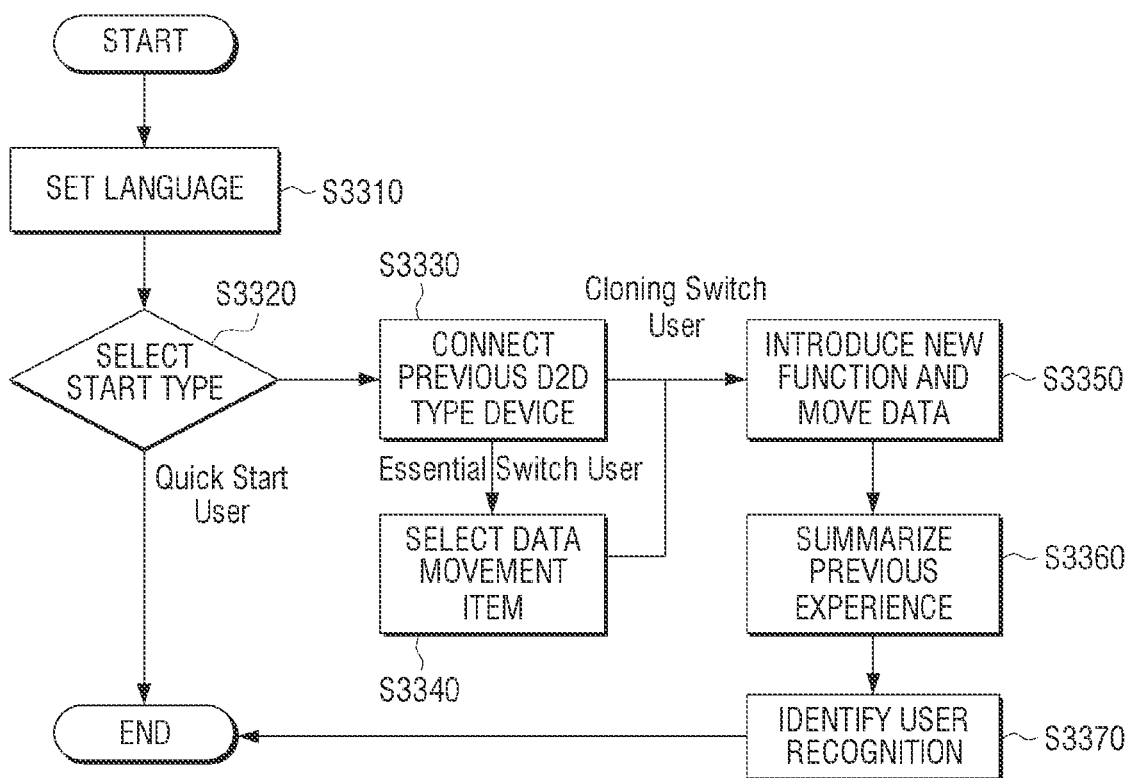
FIG. 33 is a view illustrating an example method of controlling a terminal device.

FIG. 33 is a view illustrating an example method of controlling a terminal device.

Referring to FIG. 33, a language of a new terminal device is set (S3310).

In addition, it is determined whether UI synchronization is applied or not (S3320). For example, the user interface window shown in FIG. 4 is displayed to receive selection of whether or not to apply the UI synchronization. In response to the quick start being selected, the UI setting operation may be finished without performing an additional operation.

In response to the UI synchronization being selected by the user, the terminal device is connected with another terminal device (S3330). For example, wireless connection information is transmitted through NFC tag and the two terminal devices are wirelessly connected with each other in the P2P method.

When the wireless connection is established, the terminal device may receive selection of a target item for UI synchronization in the unit of an item (S3340).

In response to the selecting operation being completed, data on the selected item is transmitted and a new function of the terminal device may be introduced in this process (S3350).

In addition, in response to all of the UI synchronization being completed, previous experiences are summarized and displayed (S3360), and, in response to user recognition being identified (S3370), a home screen of the terminal device which finishes the UI synchronization may be displayed.

Since the method of controlling according to the above-described example embodiment provides an environment in which various UIs and contents set in another terminal device can be easily selected and applied, the user can easily set the same environment as the environment that the user has used in an existing device in a new terminal device. In addition, since such an installing operation can be performed by user's simple selecting operation on various items, the synchronization can be performed by better reflecting user's intention. The method of controlling shown in FIG. 33 may be executed in the terminal device having the configuration of FIG. 3 or may be executed in terminal devices having other configurations.

In addition, the above-described method of controlling may be implemented as a program including an executable algorithm which can be executed in a computer. The program may be stored in a non-transitory computer readable medium and provided.

The foregoing example embodiments and advantages are merely illustrative and are not to be construed as limiting the disclosure. The disclosure can be readily applied to other types of apparatuses. Also, the description of the example embodiments of the disclosure is intended to be illustrative, and not to limit the scope of the claims, and many alternatives, modifications, and variations will be apparent to those skilled in the art.

What is claimed is:

1. A terminal device comprising:
a communication interface;
a display;
input circuitry; and
a computer processor configured to:
control receiving, from another terminal device, via the communication interface, a user interface (UI) item which is set for the another terminal device and preview image information corresponding to the UI item;
control the display to display the UI item and a preview image based on the preview image information, the preview image comprising a preview of the UI item applied to the terminal device;
based on receiving, through the input circuitry, user selection for applying the UI item to the terminal device, control transmitting, to the another terminal device, via the communication interface, a request for UI content corresponding to the selected UI item, the UI content including information for applying the selected UI item to the terminal device;
control receiving, via the communication interface, the UI content corresponding to the selected UI item from the another terminal device;
control setting a UI of the terminal device based on the received UI content; and
control the display to display a screen to which the set UI is applied,
wherein the UI item relates to at least one of a lock screen or a home screen,
wherein the computer processor is configured to control receiving of setting options of the another terminal device based on a user selection,
wherein the computer processor is configured to apply the setting options, and
wherein the computer processor is configured to control the display to display the preview image including an image of the terminal device applied with the UI item corresponding to the preview image information received from the another terminal device.

2. The terminal device of claim 1, wherein the computer processor is configured to control displaying, on the display, a plurality of UI items set in the another terminal device in sequence, and
wherein the input circuitry is configured to receive user selections for selecting whether to apply each of the sequentially displayed UI items to the terminal device.

3. The terminal device of claim 1, wherein the computer processor is configured to further control receiving, via the communication interface, at least one of contents stored in the another terminal device and application data about applications installed in the another terminal device, and
wherein the terminal device further comprises a storage configured to store at least one of the received contents or application data.

4. The terminal device of claim 3, wherein the computer processor is configured to install, on the terminal device, an application corresponding to an application installed on the another terminal device, based on the received application data.

5. The terminal device of claim 3, wherein the computer processor is configured to control displaying, on the display, a list of contents stored in the another terminal device, and
control the communication interface to receive only a content selected from the displayed list.

6. The terminal device of claim 5, wherein the computer processor is configured to group the contents stored in the another terminal device based on predetermined information, and control displaying, on the display, a list of groups.

7. The terminal device of claim 5, wherein the computer processor is configured to arrange the contents stored in the another terminal device based on frequency of use, and to control displaying, on the display, the contents, based on the arranging.

8. The terminal device of claim 3, wherein the computer processor is configured to reproduce at least one of the contents transmitted from the another terminal device prior to displaying the set UI.

9. The terminal device of claim 3, wherein the computer processor is configured to determine a use history based on the contents and the application data stored in the another terminal device prior to displaying the set UI, and to control displaying, on the display, a welcome message corresponding to the determined use history.

10. The terminal device of claim 1, wherein the computer processor is configured to control the communication interface to receive the UI item and the preview image information based on an initial language setting.

11. The terminal device of claim 10, wherein the computer processor is configured to control displaying, on the display, function introduction information reflecting a content stored in the another terminal device.

12. The terminal device of claim 1, wherein the computer processor is configured to control receiving of UI information including at least one of information on a background screen of the lock screen, information on a locking method of the lock screen, information on a background screen of the home screen, information on application arrangements on the home screen, or information on widget arrangements on the home screen.

13. A terminal device comprising:
a communication interface configured to receive, from another terminal device, a user interface (UI) item which is set for the another terminal device and preview image information corresponding to the UI item in response to the terminal device being initially booted and entering an initial setting state;
a display; and
a computer processor configured to:
control the display to display the UI item and a preview image based on the preview image information, the preview image comprising a preview of the UI item applied to the terminal device;
based on user selection for applying the UI item to the terminal device, control transmitting, to the another terminal device, via the communication interface, a request for UI content corresponding to the selected UI item, the UI content including information for applying the selected UI item to the terminal device;
control receiving, via the communication interface, the UI content corresponding to the selected UI item from the another terminal device;
control setting a UI of the terminal device based on the received UI content; and
control the display to display a screen to which the set UI is applied, wherein the UI item relates to at least one of a lock screen or a home screen, wherein the computer processor is configured to:
control receiving of setting options of the another terminal device based on a user selection,
apply the setting options, and
display the preview image including an image of the terminal device applied with the UI item corresponding to the preview image information received from the another terminal device.

14. A terminal device configured to be connected with another terminal device, the terminal device comprising:
a display configured to display a plurality of user interface (UI) items which are set for the terminal device in sequence;
input circuitry;
a controller configured to receive selection for a UI item among the plurality of UI items through the input circuitry;
a communication interface configured to transmit, to the another terminal device, information for setting the selected UI item to be set in the another terminal device, the transmitted information for setting the selected IU item including preview image information regarding the selected UI item for use by the another terminal device in displaying a preview image comprising a preview of the UI item applied to the another terminal device,
wherein the selected UI item relates to at least one of a lock screen or a home screen,
wherein the communication interface is configured to transmit setting options to the another terminal device for applying by the another terminal device, and
wherein the controller is configured to control the display to display the preview image including an image of the terminal device applied with the UI item corresponding to the preview image information received from the another terminal device.

15. A non-transitory computer-readable recording medium storing a program that, when executed by a computer of a terminal device, causes the computer to control the terminal device to execute operations comprising:
receiving, from another terminal device, a user interface (UI) item which is set for the another terminal device and preview image information corresponding to the UI item;
displaying the UI item and a preview image based on the preview image information, the preview image comprising a preview of the UI item applied to the terminal device;
receiving user selection for applying the UI item to the terminal device;
transmitting, to the another terminal device, a request for UI content corresponding to the selected UI item, the UI content including information for applying the selected UI item to the terminal device;
receiving the UI content corresponding to the selected UI item from the another terminal device;
setting a UI of the terminal device based on the received UI content; and
displaying, on a display, a screen to which the set UI is applied,
wherein the UI item relates to at least one of a lock screen or a home screen,
wherein the operations further comprise receiving setting options of the another terminal device based on a user selection, and applying the setting options, and
wherein the displaying the UI item and the preview image comprises displaying the preview image including an image of the terminal device applied with the UI item corresponding to the preview image information received from the another terminal device.

* * * * *